United States Patent
Agematsu

(10) Patent No.: US 10,275,079 B2
(45) Date of Patent: Apr. 30, 2019

(54) DISPLAY DEVICE WITH TOUCH DETECTION FUNCTION AND CONTROL METHOD THEREOF

(71) Applicant: Japan Display Inc., Tokyo (JP)

(72) Inventor: Shigeyuki Agematsu, Tokyo (JP)

(73) Assignee: Japan Display Inc., Tokyo (JP)

( * ) Notice: Subject to any disclaimer, the term of this patent is extended or adjusted under 35 U.S.C. 154(b) by 10 days.

(21) Appl. No.: 15/464,577

(22) Filed: Mar. 21, 2017

(65) Prior Publication Data

US 2017/0277345 A1    Sep. 28, 2017

(30) Foreign Application Priority Data

Mar. 28, 2016    (JP) .................................. 2016-064291

(51) Int. Cl.
*G06F 3/041*    (2006.01)
*G06F 3/044*    (2006.01)
*G09G 3/36*    (2006.01)

(52) U.S. Cl.
CPC ............ *G06F 3/0416* (2013.01); *G06F 3/044* (2013.01); *G06F 3/0412* (2013.01); *G06F 2203/04108* (2013.01); *G09G 3/3648* (2013.01); *G09G 2310/08* (2013.01); *G09G 2354/00* (2013.01)

(58) Field of Classification Search
CPC ...... G06F 3/0412; G06F 3/0416; G06F 3/044; G09G 3/3648
See application file for complete search history.

(56) References Cited

U.S. PATENT DOCUMENTS

| | | | | | |
|---|---|---|---|---|---|
| 4,097,813 | A | * | 6/1978 | Otani | .................. H04L 27/2276 375/326 |
| 2008/0062151 | A1 | * | 3/2008 | Kent | ...................... G06F 3/0418 345/177 |
| 2012/0056834 | A1 | * | 3/2012 | Kim | ....................... G06F 3/0418 345/173 |
| 2014/0062899 | A1 | * | 3/2014 | Lee | ........................ G06F 3/0416 345/173 |
| 2015/0084908 | A1 | * | 3/2015 | Jordan | ..................... G09G 5/12 345/174 |

(Continued)

FOREIGN PATENT DOCUMENTS

JP            2014-41555 A    3/2014

*Primary Examiner* — Antonio Xavier
(74) *Attorney, Agent, or Firm* — Michael Best & Friedrich LLP

(57) ABSTRACT

According to an aspect, a display device with a touch detection function includes: a touch detector including first group electrodes extending in a first direction and second group electrodes extending in a second direction intersecting the first direction; a display unit that displays an image; a display controller that controls the display unit to display the image on the display unit; and a touch detection controller that detects contact or proximity of a detection target object based on mutual capacitances between the first and the second group electrodes. The touch detection controller measures a frame frequency that is a number of times frames are displayed per unit time, to sequentially output touch drive signals having a frequency corresponding to the frame frequency to the first group electrodes, and to detect the contact or proximity of the detection target object based on signals output from the respective second group electrodes.

6 Claims, 13 Drawing Sheets

(56) References Cited

U.S. PATENT DOCUMENTS

2015/0177885 A1* 6/2015 Noto .................. G06F 3/044
 345/174
2015/0185956 A1 7/2015 Takayama et al.
2016/0357315 A1* 12/2016 Huang ................ G06F 3/044
2017/0147102 A1* 5/2017 Wang ................. G06F 3/0412

* cited by examiner

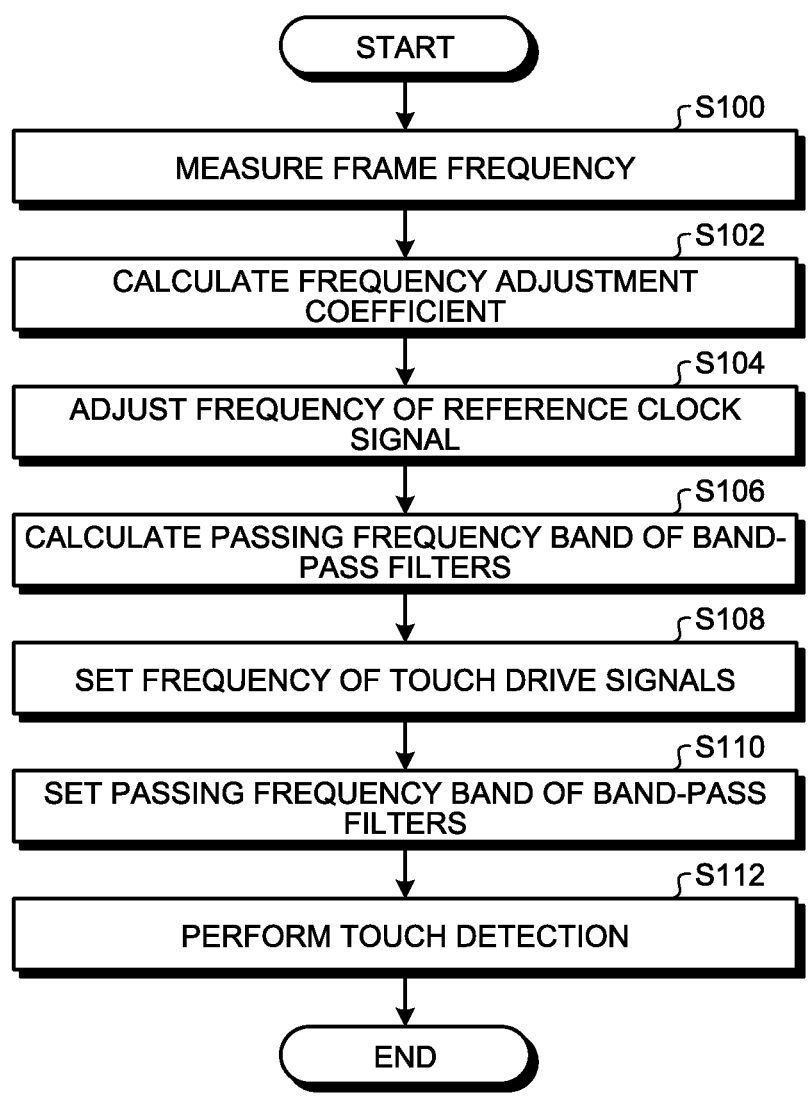

FIG.14

| | FREQUENCY INCREASE/ DECREASE AMOUNT OF DISPLAY CONTROLLER [%] | FREQUENCY INCREASE/ DECREASE AMOUNT OF TOUCH DETECTION CONTROLLER [%] | MEASUREMENT VALUE OF FRAME FREQUENCY [Hz] | FREQUENCY ADJUSTMENT COEFFICIENT | FREQUENCY SET VALUE FOR TOUCH DRIVE SIGNALS [Hz] | PASSING FREQUENCY BAND SETTING VALUE FOR BAND-PASS FILTERS [Hz] |
|---|---|---|---|---|---|---|
| DESIGN VALUE | 0 | 0 | 60 | 1 | 200 | 200±5 |
| EXAMPLE 1 | 5 | 0 | 63 | 1.05 | 210 | 210±5 |
| EXAMPLE 2 | -5 | 0 | 57 | 0.95 | 190 | 190±5 |
| EXAMPLE 3 | 0 | 5 | 57 | 0.95 | 190 | 190±5 |
| EXAMPLE 4 | 0 | -5 | 63 | 1.05 | 210 | 210±5 |
| EXAMPLE 5 | 5 | -5 | 60 | 1 | 200 | 200±5 |
| EXAMPLE 6 | -5 | 5 | 60 | 1 | 200 | 200±5 |
| EXAMPLE 7 | 5 | 5 | 66 | 1.1 | 220 | 220±5 |
| EXAMPLE 8 | -5 | -5 | 54 | 0.9 | 180 | 180±5 |

DISPLAY DEVICE WITH TOUCH DETECTION FUNCTION AND CONTROL METHOD THEREOF

CROSS-REFERENCE TO RELATED APPLICATIONS

This application claims priority from Japanese Application No. 2016-064291, filed on Mar. 28, 2016, the contents of which are incorporated by reference herein in its entirety.

BACKGROUND

1. Technical Field

The present invention relates to a display device with a touch detection function capable of detecting an external proximate object, and to a control method thereof.

2. Description of the Related Art

In recent years, attention has been drawn to a touch detection device commonly called a touch panel that is capable of detecting an external proximate object. The touch panel is mounted on a display device, such as a liquid crystal display device, or is integrated with the display device, so as to serve as a display device with a touch detection function. The display device with a touch detection function displays, for example, various button images on the display device so as to allow input of information using the touch panel as a substitute for typical mechanical buttons.

Japanese Patent Application Laid-open Publication No. 2014-041555 (JP-A-2014-041555) describes a touch panel driving device capable of detecting a touch signal by adjusting a cycle or time of a horizontal synchronization period of a drive signal when detecting external noise caused by, for example, an inverter fluorescent lamp, an amplitude modulation (AM) wave, and an alternating current (AC) power supply.

The touch panel driving device described in JP-A-2014-041555 does not take into account internal noise of the touch panel driving device.

SUMMARY

According to an aspect, a display device with a touch detection function includes: a touch detector including first group electrodes extending in a first direction and second group electrodes extending in a second direction intersecting the first direction; a display unit configured to display an image; a display controller configured to control the display unit to display the image on the display unit; and a touch detection controller configured to detect contact or proximity of a detection target object based on mutual capacitances between the first group electrodes and the second group electrodes. The touch detection controller is configured to measure a frame frequency that is a number of times frames are displayed per unit time, to sequentially output touch drive signals having a frequency corresponding to the frame frequency to the first group electrodes, and to detect the contact or proximity of the detection target object based on a plurality of signals output from the respective second group electrodes.

According to another aspect, a method for controlling a display device with a touch detection function that includes a touch detector including first group electrodes extending in a first direction and second group electrodes extending in a second direction intersecting the first direction, and a display unit configured to display an image, the method includes: measuring a frame frequency that is a number of times frames are displayed per unit time; sequentially outputting touch drive signals having a frequency corresponding to the frame frequency to the first group electrodes; and detecting contact or proximity of a detection target object based on a plurality of signals output from the respective second group electrodes.

BRIEF DESCRIPTION OF THE DRAWINGS

FIG. 13 is a flowchart illustrating an operation of the touch detection controller;

FIG. 14 is a diagram illustrating setting examples of the touch detection controller.

DETAILED DESCRIPTION

Figure 1:
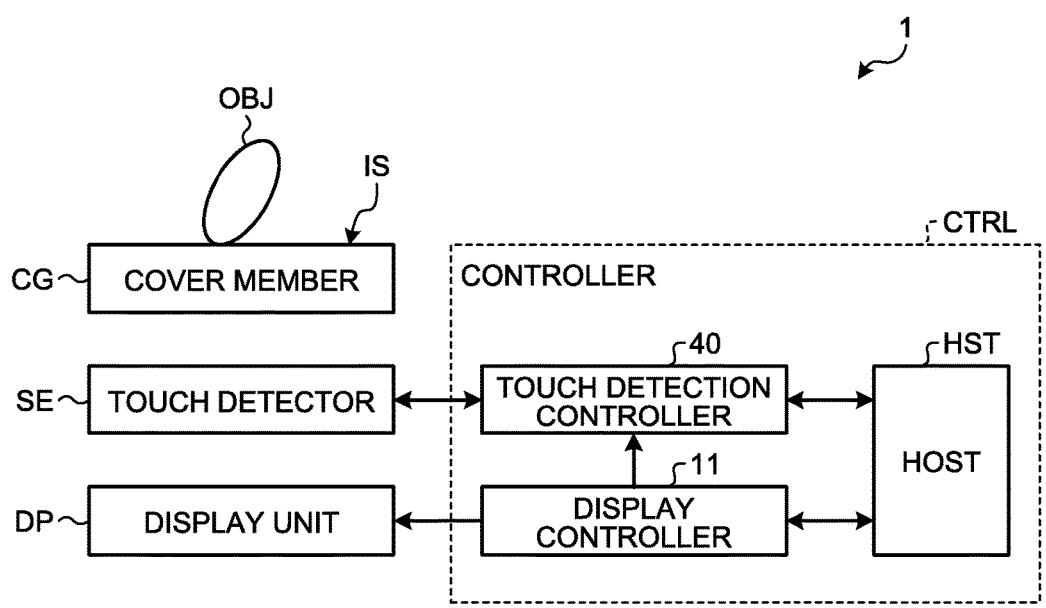
FIG. 1 is a block diagram illustrating a configuration of a display device with a touch detection function according to an embodiment of the present invention.

A mode (embodiment) for carrying out the present invention will be described in detail with reference to the drawings. The present invention is not limited to the description of the embodiment to be given below. Components to be described below include those easily conceivable by those skilled in the art, and those substantially the same. The components to be described below can also be combined as appropriate. The disclosure is merely an example, and the present invention naturally encompasses appropriate modifications maintaining the gist of the invention that is easily conceivable by those skilled in the art. To further clarify the description, widths, thicknesses, shapes, and the like of various parts may be schematically illustrated in the drawings as compared with actual aspects thereof. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

Embodiment

FIG. 1 is a block diagram illustrating a configuration of a display device with a touch detection function according to an embodiment of the present invention.

This display device with a touch detection function 1 according to the present embodiment includes a touch detector SE, a display unit DP, and a controller CTRL.

The touch detector SE detects contact or proximity of a detection target object OBJ with or to an input surface IS of a cover member CG. Specifically, the touch detector SE outputs, to the controller CTRL, a signal value corresponding to the contact or proximity of the detection target object OBJ with or to each of regions where the detection target object OBJ overlaps the input surface IS in a direction orthogonal to the input surface IS.

The number of detection target objects detectable by the touch detector SE is not limited to one. The touch detector SE may be capable of detecting two or more detection target objects.

Examples of the touch detector SE include a sensor using a capacitance method. Examples of the capacitance method include a mutual capacitance method.

The display unit DP displays an image toward the input surface IS. Examples of the display unit DP include, but are not limited to, a liquid crystal display device and an organic electroluminescent (EL) display device.

The touch detector SE and the display unit DP have what is called an on-cell configuration in which the touch detector SE is mounted above the display unit DP, but the present disclosure is not limited to such a configuration. An in-cell configuration may be employed in which the touch detector SE and the display unit DP are be integrated with each other.

The controller CTRL detects the coordinates of the detection target object OBJ based on a signal value corresponding to contact or proximity of the detection target object OBJ in a region where the detection target object OBJ is in contact with or in proximity to the input surface IS.

The controller CTRL includes a display controller 11, a touch detection controller 40, and a host HST.

Examples of the display controller 11 include, but are not limited to, an integrated circuit (IC) chip mounted on a glass substrate of the display unit DP. Examples of the touch detection controller 40 include, but are not limited to, an IC chip mounted on a glass substrate of the touch detector SE. Examples of the host HST include, but are not limited to, a central processing unit (CPU). The display controller 11, the touch detection controller 40, and the host HST cooperate together to control the touch detector SE and the display unit DP.

The following describes specific configuration examples of the touch detector SE and the display unit DP. These are merely examples, and do not limit the present disclosure.

Configuration Example of Touch Detector and Display Unit

Figure 2:
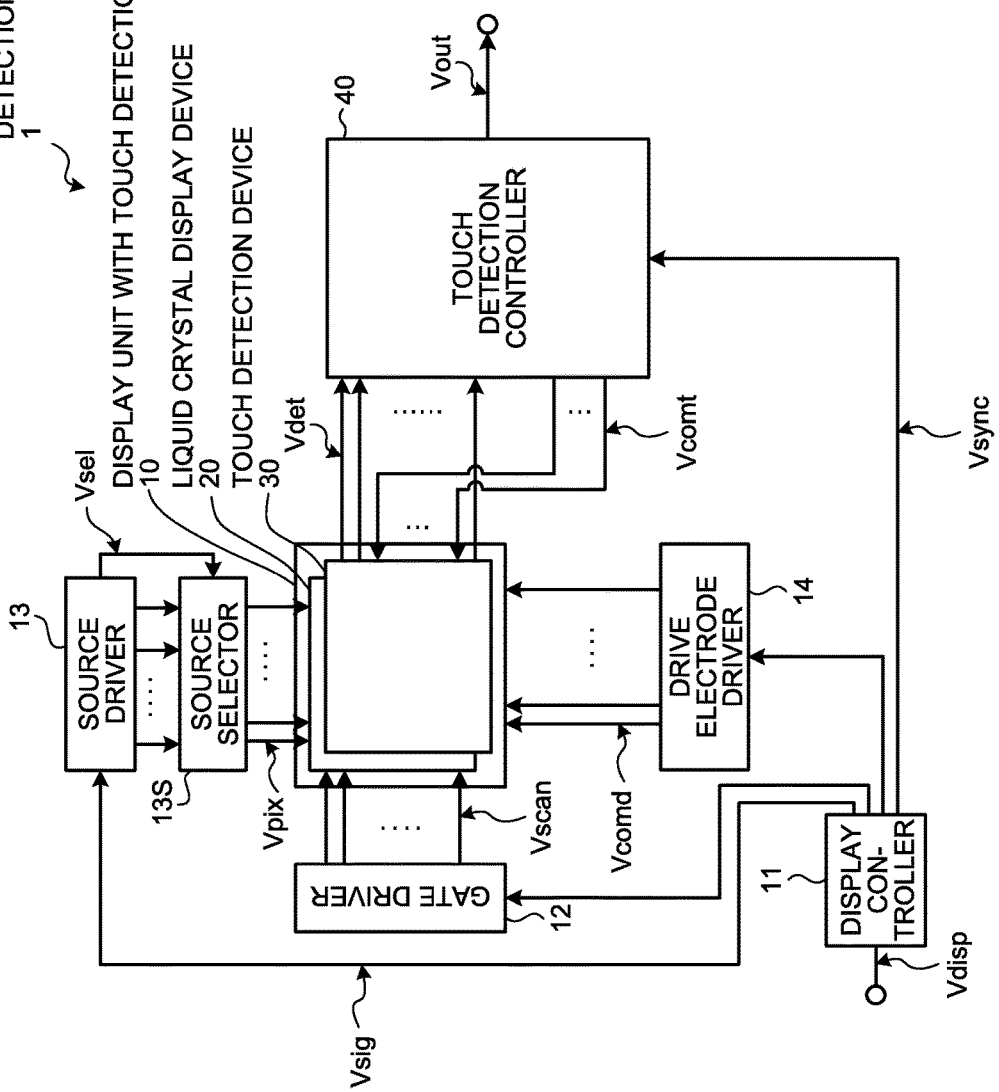
FIG. 2 is a block diagram illustrating a configuration example of a touch detector and a display unit of the display device with a touch detection function.

FIG. 2 is a block diagram illustrating a configuration example of the touch detector and the display unit of the display device with a touch detection function. The display device with a touch detection function 1 illustrated in FIG. 2 is a device that detects the coordinates of the detection target object OBJ by the mutual capacitance method.

The display device with a touch detection function 1 includes a display unit with a touch detection function 10, the display controller 11, a gate driver 12, a source driver 13, a source selector 13S, a drive electrode driver 14, and the touch detection controller 40.

The display unit with a touch detection function 10 is what is called an on-cell display device in which a capacitive touch detection device 30 is mounted above a liquid crystal display device 20 that uses liquid crystal display elements as display elements. In the case of the on-cell display device, the touch detection device 30 may be disposed directly on the liquid crystal display device 20, or may be disposed, not directly on, but above the liquid crystal display device 20 with another layer interposed therebetween.

The liquid crystal display device 20 corresponds to the display unit DP of FIG. 1. The touch detection device 30 corresponds to the touch detector SE of FIG. 1.

The display unit with a touch detection function 10 may be what is called an in-cell device in which the capacitive touch detection device 30 is incorporated in an integrated manner into the liquid crystal display device 20 that uses the liquid crystal display elements as the display elements. The configuration in which the capacitive touch detection device 30 is incorporated in an integrated manner into the liquid crystal display device 20 includes, for example, a configuration in which some members such as substrates and electrodes used for the liquid crystal display device 20 also serve as members of the touch detection device 30.

Although the present configuration example employs the liquid crystal display device 20 as the display unit DP, the display unit DP may have a configuration employing an organic EL element. In this case, one of the anode and the cathode of the organic EL element may serve as a drive electrode COML for touch detection (to be described later).

As will be described later, the liquid crystal display device 20 is a device that performs display by sequentially scanning each one horizontal line according to a scan signal Vscan supplied from the gate driver 12.

The display controller 11 is a circuit that supplies a control signal to each of the gate driver 12, the source driver 13, and the drive electrode driver 14, based on a video signal Vdisp supplied from the host HST so as to control these drivers to operate in synchronization with one another. The display controller 11 generates, from the video signal Vdisp for one horizontal line, an image signal Vsig obtained by time-division multiplexing pixel signals Vpix of a plurality of sub-pixels SPix in the liquid crystal display device 20, and supplies the image signal Vsig to the source driver 13. The display controller 11 also supplies a vertical synchronizing signal Vsync indicating display start timing of each frame to the touch detection controller 40.

The controller CTRL in the present disclosure includes the display controller 11, the gate driver 12, the source driver 13 and the drive electrode driver 14.

The gate driver 12 has a function to sequentially select each one horizontal line to be driven for display by the display unit with a touch detection function 10, based on the control signal supplied from the display controller 11.

The source driver 13 is a circuit that supplies the pixel signal Vpix to each pixel Pix (sub-pixel SPix) of the display unit with a touch detection function 10, based on the control signal supplied from the display controller 11. The source driver 13 is supplied with the image signal Vsig having, for example, 6 bits of red (R), green (G), and blue (B).

The source driver 13 receives the image signal Vsig from the display controller 11, and supplies the image signal Vsig to the source selector 13S. The source driver 13 generates a switch control signal Vsel required for separating the pixel signal Vpix that has been multiplexed into the image signal Vsig, and supplies the switch control signal Vsel together with the image signal Vsig to the source selector 13S. The source selector 13S can reduce the number of wiring lines between the source driver 13 and the display controller 11. The source selector 13S may be omitted. The source driver 13 may be partially controlled by the display controller 11, or only the source selector 13S may be disposed.

The drive electrode driver 14 is a circuit that supplies a display drive signal Vcomd serving as a voltage for display to the drive electrode COML (to be described later) of the display unit with a touch detection function 10, based on the control signal supplied from the display controller 11.

The touch detection device 30 operates based on the basic principle of mutual capacitance touch detection, and outputs touch detection signals Vdet.

Figure 3:
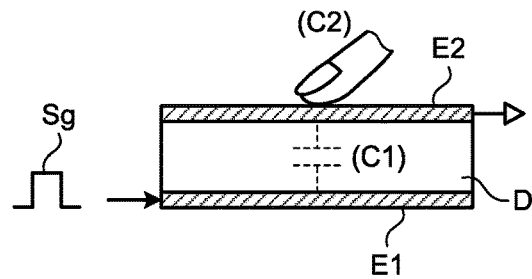
FIG. 3 is an explanatory diagram illustrating an example of a capacitance generated in a touch detection device.
Figure 4:
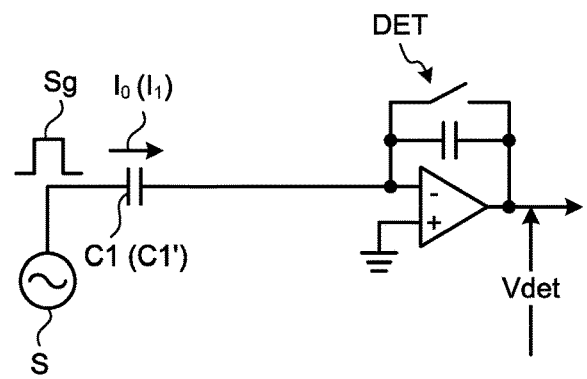
FIG. 4 is an explanatory diagram illustrating an exemplary equivalent circuit of the touch detection device.
Figure 5:
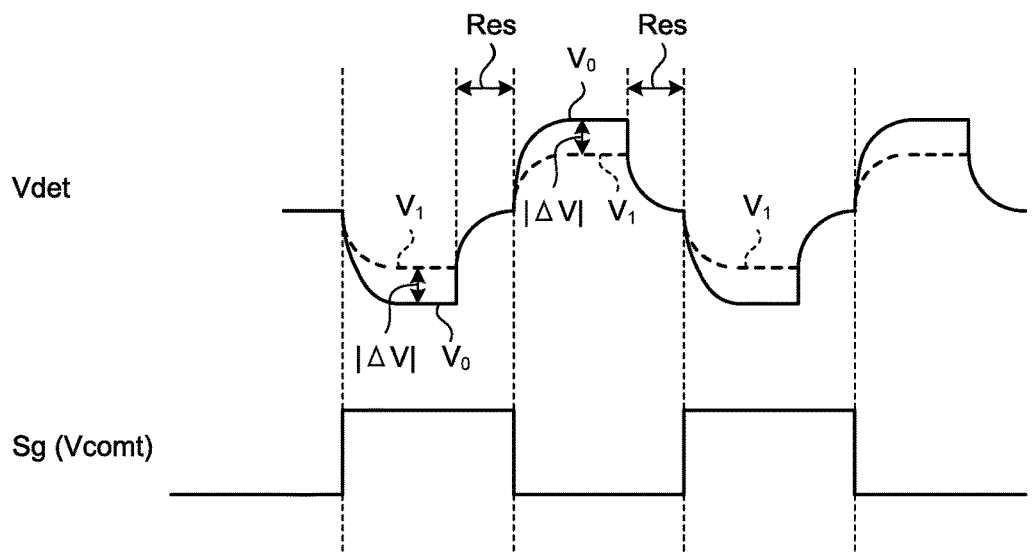
FIG. 5 is a diagram illustrating an example of waveforms of a drive signal and a touch detection signal.

The following describes the basic principle of the mutual capacitance touch detection performed by the display device with a touch detection function 1 of the present configuration example, with reference to FIGS. 3 to 5.

FIG. 3 is an explanatory diagram illustrating an example of a capacitance generated in the touch detection device. FIG. 4 is an explanatory diagram illustrating an exemplary equivalent circuit of the touch detection device. FIG. 5 is a diagram illustrating an example of waveforms of the drive signal and the touch detection signal. FIG. 4 also illustrates a detection circuit.

For example, as illustrated in FIG. 3, a capacitive element C1 includes a pair of electrodes, i.e., a drive electrode E1 and a touch detection electrode E2 arranged facing each other with a dielectric material D interposed therebetween. As illustrated in FIG. 4, the capacitive element C1 is coupled, at one end thereof, to an alternating-current signal source (drive signal source) S, and coupled, at the other end thereof, to a voltage detector (touch detector) DET. The voltage detector DET is, for example, an integration circuit, and is included in the touch detection controller 40.

When an alternating-current (AC) rectangular wave Sg having a predetermined frequency (such as approximately several kilohertz to several hundred kilohertz) is applied from the alternating-current signal source S to the drive electrode E1 (one end of the capacitive element C1), an output waveform (touch detection signal Vdet) appears through the voltage detector DET coupled to the touch detection electrode E2 side (the other end of the capacitive element C1). The AC rectangular wave Sg corresponds to the touch drive signal Vcomt (to be described later).

In the state (non-contact state) where a finger is not in contact with (or in proximity to) the touch detection electrode, a current $I_0$ corresponding to the capacitance value of the capacitive element C1 flows in accordance with charge and discharge of the capacitive element C1. The voltage detector DET converts a variation in the current $I_0$ corresponding to the AC rectangular wave Sg into a variation in voltage (waveform $V_0$ of a solid line), as illustrated in FIG. 5.

In the state (contact state) where the finger is in contact with (or in proximity to) the touch detection electrode, an electrostatic capacitance C2 formed by the finger in contact with or in proximity to the touch detection electrode E2, as illustrated in FIG. 3. This shields the electrostatic capacitance in a fringe portion between the drive electrode E1 and the touch detection electrode E2, and thus causes the capacitive element to act as a capacitive element C1' having a smaller capacitance value than that of the capacitive element C1. Referring to the equivalent circuit illustrated in FIG. 4, a current $I_1$ flows through the capacitive element C1'. The voltage detector DET converts a variation in the current $I_1$ corresponding to the AC rectangular wave Sg into a varia-tion in voltage (waveform $V_1$ of a dotted line), as illustrated in FIG. 5. In this case, the waveform $V_1$ has a smaller amplitude than that of the above-mentioned waveform $V_0$. As a result, an absolute value $|\Delta V|$ of a voltage difference between the waveforms $V_0$ and $V_1$ changes according to an influence of an object, such as the finger, approaching from the outside. To accurately detect the absolute value $|\Delta V|$ of the voltage difference between the waveforms $V_0$ and $V_1$, the voltage detector DET preferably performs an operation having a period Res during which the charge or discharge of the capacitor is reset by switching in the circuit in accordance with the frequency of the AC rectangular wave Sg.

The touch detection device 30 illustrated in FIG. 2 is configured to perform the touch detection by sequentially scanning each one line according to the touch drive signal Vcomt (to be described later) supplied from the touch detection controller 40.

The touch detection controller 40 is a circuit that detects whether there is a touch on the touch detection device 30 (in the contact state or the proximity state described above), based on the vertical synchronizing signal Vsync supplied from the display controller 11 and the touch detection signal Vdet supplied from the touch detection device 30 of the display unit with a touch detection function 10, and that obtains, when there is a touch on the touch detection device 30, the coordinates and the contact area of the touch in a touch detection area.

Figure 6:
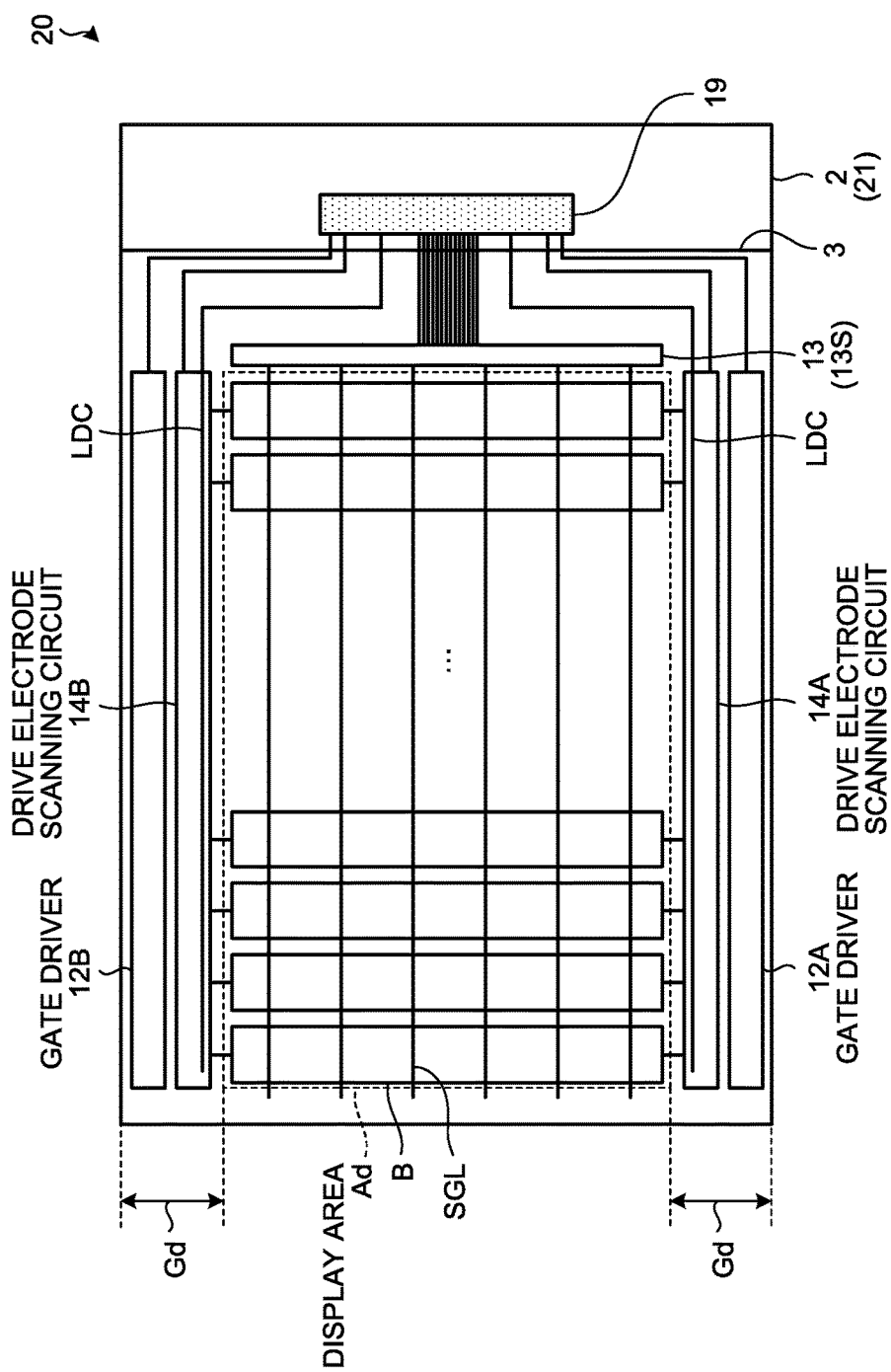
FIG. 6 is a diagram illustrating an exemplary module of a liquid crystal display device.

FIG. 6 is a diagram illustrating an exemplary module of the liquid crystal display device. The liquid crystal display device 20 includes a first substrate (such as a pixel substrate 2).

The pixel substrate 2 includes a first insulating substrate (such as a thin-film transistor (TFT) substrate 21). The TFT substrate 21 is, for example, a glass substrate or a film substrate. A display driver IC (such as a chip on glass (COG)) 19 is mounted on the TFT substrate 21. A display area Ad and a frame Gd of the liquid crystal display device 20 are formed on the pixel substrate 2 (TFT substrate 21). The frame Gd is an area on the periphery of the display area Ad, and is called a non-display area or a peripheral area.

The display driver IC 19 is an IC chip serving as a driver mounted on the TFT substrate 21, and is a control device incorporating circuits required for display operations, such as the display controller 11 illustrated in FIG. 2.

In the present configuration example, the source driver 13 and the source selector 13S are formed on the TFT substrate 21. The source driver 13 and the source selector 13S may be built into the display driver IC 19.

Drive electrode scanning circuits 14A and 14B that are a part of the drive electrode driver 14 are formed on the TFT substrate 21.

The gate driver 12 is formed as gate drivers 12A and 12B on the TFT substrate 21.

The display driver IC 19 may incorporate circuits, such as the drive electrode scanning circuits 14A and 14B, and the gate driver 12. This configuration of mounting the display driver IC 19 is merely an example, and the present disclosure is not limited thereto. For example, a component having the same function as that of the display driver IC 19 may be mounted as a chip on film or chip on flexible (COF) on a flexible printed circuit board coupled to the pixel substrate 2. In this case, the display driver IC 19 is provided outside the module.

As illustrated in FIG. 6, drive electrode blocks B of the drive electrodes COML and pixel signal lines SGL are formed so as to three-dimensionally intersect each other in a direction orthogonal to a surface of the TFT substrate 21.

The drive electrodes COML are divided into a plurality of stripe-like electrode patterns extending in one direction.

The drive electrode blocks B (drive electrodes COML) are formed so as to extend in a direction parallel to short sides of the liquid crystal display device 20. The pixel signal lines SGL are formed so as to extend in a direction intersecting the extending direction of the drive electrode blocks B, for example, in a direction parallel to long sides of the liquid crystal display device 20.

The source selector 13S is formed using TFT elements near the display area Ad on the TFT substrate 21. A large number of pixels Pix (to be described later) are arranged in a matrix in the display area Ad. In the present embodiment, the pixels Pix are arranged in a 1920×1080 matrix, but the present disclosure is not limited to this arrangement.

The frame Gd is an area in which the pixels Pix are not disposed on the surface of the TFT substrate 21 when viewed from a direction orthogonal thereto. The gate driver 12 and the drive electrode scanning circuits 14A and 14B of the drive electrode driver 14 are disposed in the frame Gd.

The gate driver 12 includes, for example, the gate drivers 12A and 12B, which are formed using TFT elements on the TFT substrate 21. The display area Ad in which the sub-pixels SPix (pixels) (to be described later) are arranged in a matrix is interposed between the gate drivers 12A and 12B, so that the gate drivers 12A and 12B can perform driving from both sides. Scanning lines are arranged between the gate drivers 12A and 12B. As a result, the scanning lines are arranged so as to extend in a direction parallel to the extending direction of the drive electrodes COML in the direction orthogonal to the surface of the TFT substrate 21.

In the present configuration example, the two circuits, i.e., the gate drivers 12A and 12B are provided as the gate driver 12. However, this is merely an exemplary specific configuration of the gate driver 12. The specific configuration thereof is not limited to this example. The gate driver 12 may be, for example, one circuit provided on only one end side of the scanning lines.

The drive electrode driver 14 includes, for example, the drive electrode scanning circuits 14A and 14B, which are formed using TFT elements on the TFT substrate 21. The drive electrode scanning circuits 14A and 14B are supplied with the display drive signals Vcomd from the display driver IC 19 through display wiring LDC.

The drive electrode scanning circuits 14A and 14B are configured to be capable of driving the respective drive electrode blocks B arranged in parallel from both sides thereof. Lines of the display wiring LDC for supplying the display drive signals Vcomd are arranged in parallel in the frames Gd.

In the present configuration example, the two circuits, i.e., the drive electrode scanning circuits 14A and 14B are provided as the drive electrode driver 14. This is merely an exemplary specific configuration of the drive electrode driver 14, and the present disclosure is not limited to this example. The drive electrode driver 14 may be, for example, one circuit provided on only one end of the drive electrode blocks B.

Figure 7:
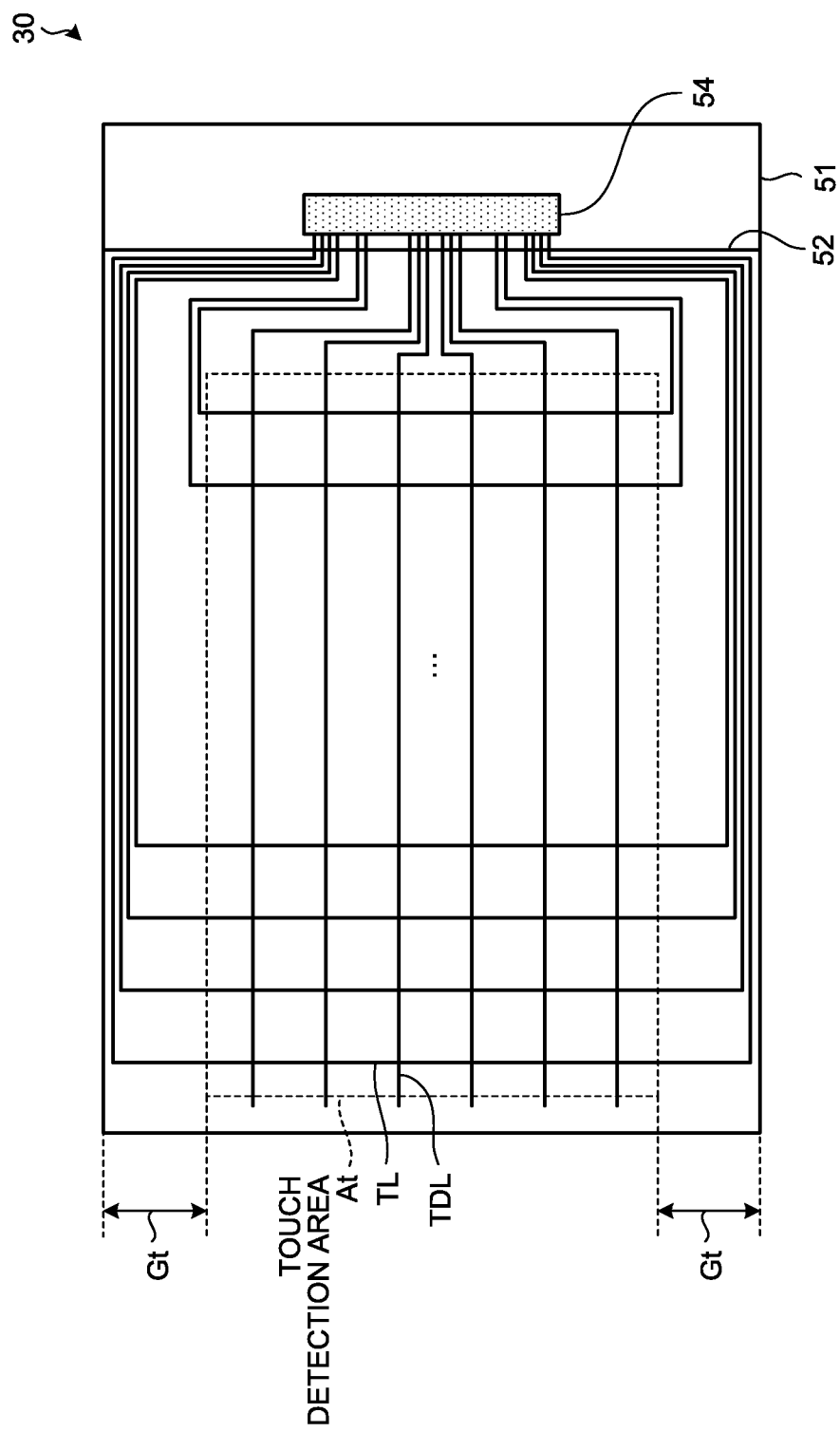
FIG. 7 is a diagram illustrating an exemplary module of the touch detection device.

FIG. 7 is a diagram illustrating an exemplary module of the touch detection device. The touch detection device 30 includes a third substrate 51.

The third substrate 51 is, for example, a glass substrate or a film substrate having an insulating property. A touch IC (such as a COG) 54 is mounted on the third substrate 51. A touch detection area At and a frame Gt are formed on the third substrate 51. The touch detection area At is formed so as to overlap the display area Ad of the liquid crystal display device 20 in a direction orthogonal to a surface of the third substrate 51. The frame Gt is formed so as to overlap the frame Gd of the liquid crystal display device 20 in the direction orthogonal to the surface of the third substrate 51.

The touch IC 54 is an IC chip serving as a driver mounted on the third substrate 51, and is a control device incorporating circuits required for the touch detection operation, such as the touch detection controller 40 illustrated in FIG. 2. The configuration of the touch IC 54 is not limited to the case of being disposed on the third substrate 51, and the touch IC 54 may be disposed on a fourth substrate 52.

The touch IC 54 is merely one form of implementation, and the present disclosure is not limited to this form. For example, a configuration having the same function as that of the touch IC 54 may be mounted as a COF on a flexible printed circuit board coupled to the third substrate 51. In this case, the touch IC 54 is provided outside the module.

As illustrated in FIG. 7, touch drive electrodes TL and touch detection electrodes TDL are formed so as to three-dimensionally intersect each other in the direction orthogonal to the surface of the third substrate 51.

The touch drive electrodes TL are formed so as to extend in a direction parallel to short sides of the touch detection device 30. The touch detection electrodes TDL are formed so as to extend in a direction intersecting the extending direction of the touch drive electrodes TL, for example, so as to extend in a direction parallel to long sides of the touch detection device 30.

The touch drive electrodes TL arranged in parallel are coupled to the touch IC 54 mounted on a short side of the touch detection device 30. In this manner, the touch IC 54 is mounted on the third substrate 51, and is coupled to the respective touch drive electrodes TL arranged in parallel.

The touch detection electrodes TDL are coupled to the touch IC 54 mounted on a short side of the touch detection device 30. In this manner, the touch IC 54 is mounted on the third substrate 51, and is coupled to the respective touch detection electrodes TDL arranged in parallel.

The touch IC 54 is configured to be capable of driving the respective touch drive electrodes TL arranged in parallel, from both sides thereof.

In the present configuration example, the touch IC 54 drives the respective touch drive electrodes TL arranged in parallel, from both sides thereof. The present disclosure is, however, not limited to this configuration. For example, the touch IC 54 may drive the touch drive electrodes TL from only one end side thereof.

In the present configuration example, the touch IC 54 is a control device serving as the touch detection controller 40. However, some functions of the touch detection controller 40 may be provided as functions of another microprocessor unit (MPU).

Specifically, a circuit, such as the MPU, provided separately from the IC chip serving as the touch driver may perform some functions (such as denoising) among various functions, such as the A/D conversion and the denoising that can be provided as functions of the IC chip serving as the touch driver. If the IC chip serving as the driver is configured as one chip (single-chip configuration), the detection signals may be transmitted, for example, to the IC chip serving as the driver on the first insulating substrate through wiring of, for example, the flexible printed circuit board.

The touch detection device 30 outputs the touch detection signals Vdet from a short side of the touch detection device 30. This facilitates routing of wiring in the touch detection device 30 when the touch detection device 30 is coupled to the touch IC 54.

Figure 8:
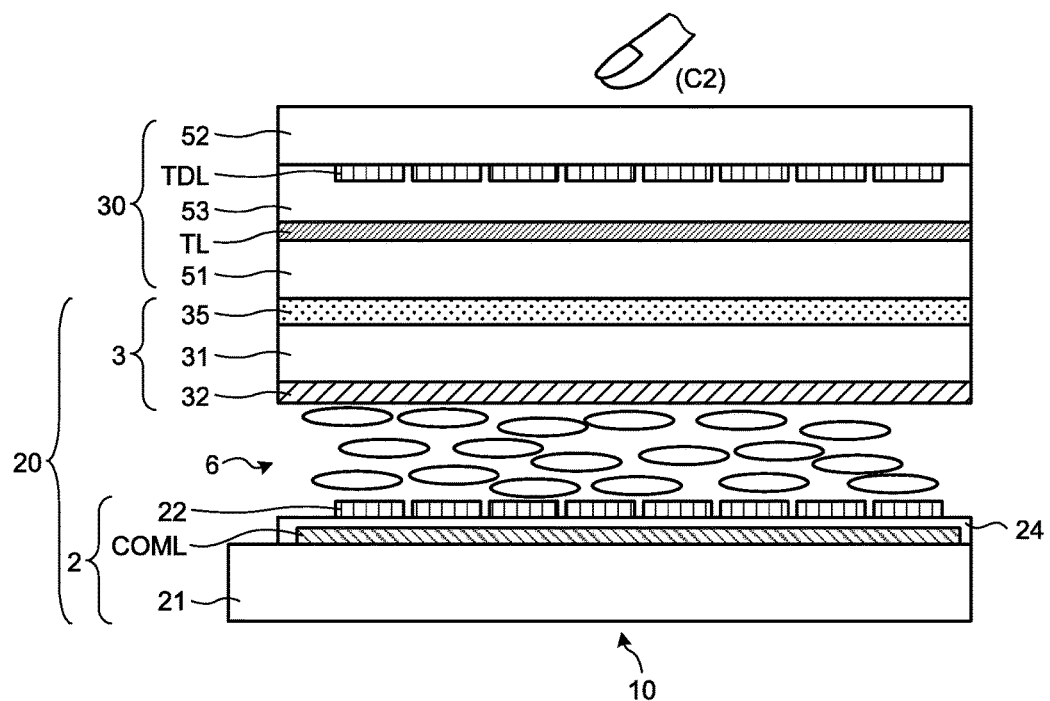
FIG. 8 is a sectional view illustrating a schematic sectional structure of a display unit with a touch detection function.
Figure 9:
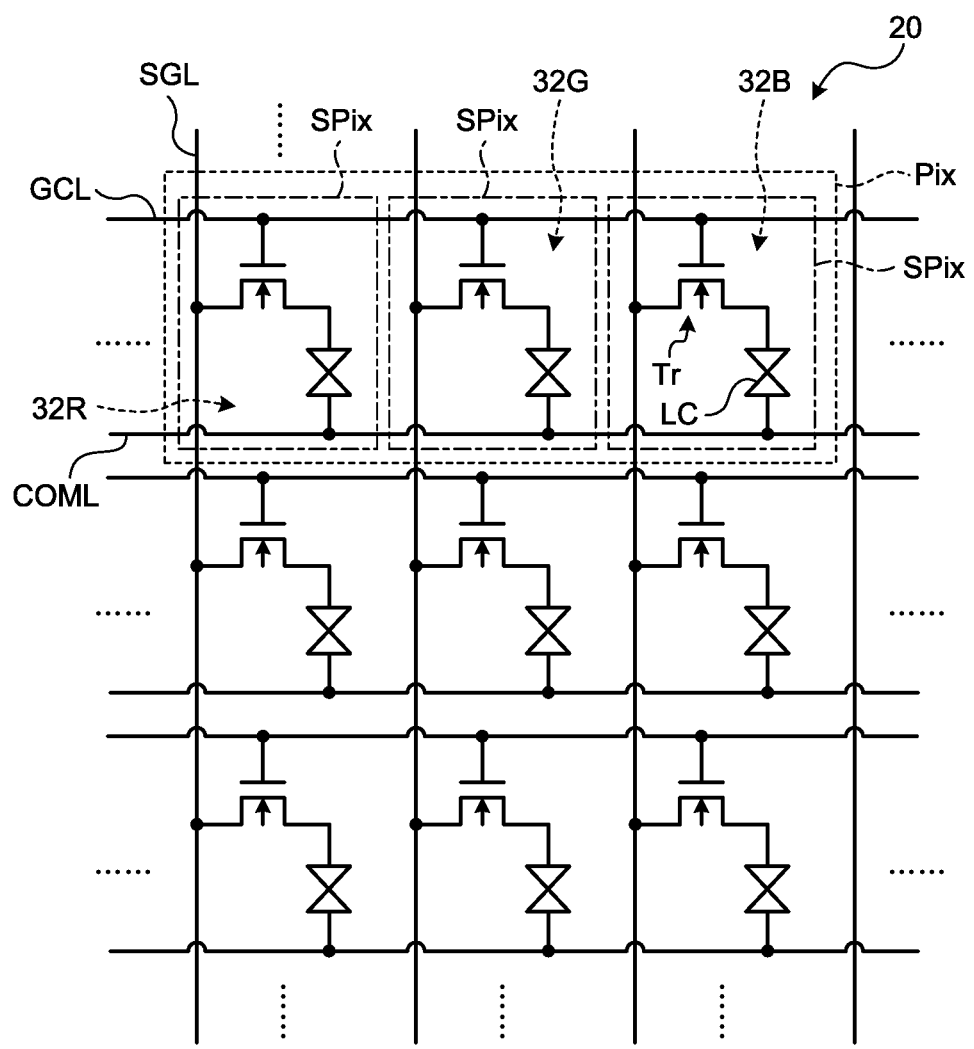
FIG. 9 is a circuit diagram illustrating a pixel arrangement of the display unit with a touch detection function.

FIG. 8 is a sectional view illustrating a schematic sectional structure of the display unit with a touch detection function. FIG. 9 is a circuit diagram illustrating a pixel arrangement of the display unit with a touch detection function. The display unit with a touch detection function 10 includes the first substrate (such as the pixel substrate 2), a second substrate (such as a counter substrate 3) that is disposed so as to face a surface of the pixel substrate 2 in a direction orthogonal thereto, and a display functional layer (such as a liquid crystal layer 6) that is interposed between the pixel substrate 2 and the counter substrate 3.

The pixel substrate 2 includes the TFT substrate 21 serving as a circuit substrate, a plurality of pixel electrodes 22 that are arranged in a matrix on the TFT substrate 21, the drive electrodes COML that are formed between the TFT substrate 21 and the pixel electrodes 22, and an insulating layer 24 that insulates the pixel electrodes 22 from the drive electrodes COML.

As illustrated in FIG. 9, thin-film transistor (TFT) elements Tr of the sub-pixels SPix and wiring, such as pixel signal lines SGL that supply the pixel signals Vpix to the respective pixel electrodes 22 illustrated in FIG. 8 and scan signal lines GCL that drive the respective TFT elements Tr, are formed on the TFT substrate 21. The pixel signal lines SGL extend in a plane parallel to the surface of the TFT substrate 21, and supply the pixel signals Vpix for displaying an image to the sub-pixels SPix. The sub-pixels SPix represent constitutional units controlled by the pixel signals Vpix. The sub-pixels SPix also represent constitutional units that are surrounded by the pixel signal lines SGL and the scan signal lines GCL and that are controlled by the TFT elements Tr.

As illustrated in FIG. 9, the liquid crystal display device 20 includes the sub-pixels SPix that are arranged in a matrix. Each of the sub-pixels SPix includes one of the TFT elements Tr and a liquid crystal element LC. Each TFT element Tr is constituted by a thin-film transistor, and in this example, is constituted by an n-channel metal oxide semiconductor (MOS) TFT.

In each of the TFT elements Tr, one of the source and the drain is coupled to one of the pixel signal lines SGL, the gate is coupled to one of the scan signal lines GCL, and the other of the source and the drain is coupled to one end of the liquid crystal element LC. The liquid crystal element LC is coupled, for example, at one end thereof to the drain of the TFT element Tr, and at the other end thereof to one of the drive electrodes COML. In FIG. 8, the drive electrodes COML, the insulating layer 24, and the pixel electrodes 22 are sequentially stacked in this order on the TFT substrate 21. The order of stacking is, however, not limited to this example. The order of stacking on the TFT substrate 21 may be the pixel electrodes 22, the insulating layer 24, and the drive electrodes COML. Alternatively, the drive electrodes COML and the pixel electrodes 22 may be formed in the same layer with the insulating layer 24 interposed therebetween.

The sub-pixel SPix is mutually coupled through the scan signal line GCL with other sub-pixels SPix belonging to the same row of the liquid crystal display device 20. The scan signal line GCL is coupled to the gate driver 12, and is supplied with the scan signal Vscan from the gate driver 12.

The sub-pixel SPix is mutually coupled through the pixel signal line SGL with other sub-pixels SPix belonging to the same column of the liquid crystal display device 20. The pixel signal line SGL is coupled to the source driver 13 (source selector 13S), and is supplied with the pixel signal Vpix from the source driver 13.

The sub-pixel SPix is further mutually coupled through the drive electrode COML with other sub-pixels SPix belonging to the same row of the liquid crystal display device 20. The drive electrode COML is coupled to the drive electrode driver 14, and is supplied with the display drive signal Vcomd from the drive electrode driver 14. This means that the sub-pixels SPix belonging to the same one of the rows share one of the drive electrodes COML in this example.

The drive electrodes COML of the present configuration example extend in parallel to the extending direction of the scan signal lines GCL. The extending direction of the drive electrodes COML is not limited to this direction, but may be, for example, a direction parallel to the extending direction of the pixel signal lines SGL. The extending direction of the touch detection electrodes TDL is not limited to the extending direction of the pixel signal lines SGL, but may be, for example, a direction parallel to the extending direction of the scan signal lines GCL.

The gate driver 12 illustrated in FIG. 2 applies the scan signal Vscan to the gates of the TFT elements Tr of the pixels Pix through the scan signal line GCL illustrated in FIG. 9 so as to sequentially select, as a target of display driving, each one row (one horizontal line) of the sub-pixels SPix that are formed in a matrix on the liquid crystal display device 20.

The source driver 13 illustrated in FIG. 2 supplies the pixel signals Vpix to the respective sub-pixels SPix constituting the horizontal line sequentially selected by the gate driver 12 through the pixel signal lines SGL illustrated in FIG. 9. The sub-pixels SPix are configured to perform display for the horizontal line according to the pixel signals Vpix thus supplied.

The drive electrode driver 14 illustrated in FIG. 2 applies the display drive signals Vcomd to drive the drive electrodes COML on a block-by-block basis, each block being constituted by a predetermined number of drive electrodes COML.

As described above, in the liquid crystal display device 20, the gate driver 12 performs driving so as to line-sequentially scan the scan signal lines GCL in a time-division manner, and thus sequentially selects each one horizontal line. The source driver 13 supplies the pixel signals Vpix to the sub-pixels SPix belonging to the horizontal line, and thus, the liquid crystal display device 20 performs display for each one horizontal line. The drive electrode driver 14 is configured to apply the display drive signals Vcomd to the blocks including the drive electrodes COML corresponding to the horizontal line while this display operation is performed.

The liquid crystal layer 6 modulates light passing therethrough according to the state of electric field. When the drive electrodes COML are driven, voltages according to the pixel signals Vpix supplied to the pixel electrodes 22 are applied to the liquid crystal layer 6 and generate the electric field. As a result, liquid crystals constituting the liquid crystal layer 6 are oriented according to the electric field, thereby modulating the light passing through the liquid crystal layer 6.

In this manner, the pixel electrodes 22 and the drive electrodes COML serve as first electrodes and second electrodes that generate the electric field in the liquid crystal layer 6. That is, the liquid crystal display device 20 serves as the display unit DP that changes the content of display output according to electric charges applied to the first electrodes and the second electrodes. Although the following description assumes that the pixel electrodes 22 correspond to the first electrodes, and the drive electrodes COML correspond to the second electrodes, these correspondence relations may be reversed. Each of the pixel electrodes 22 is arranged for at least one pixel Pix or at least one sub-pixel SPix. Each of the drive electrodes COML is arranged for at least a plurality of such pixels Pix or at least a plurality of such sub-pixels SPix.

In the present configuration example, a liquid crystal display device using, for example, liquid crystals of the horizontal electric field mode, such as an in-plane switching (IPS) mode including a fringe field switching (FFS) mode, is used as the liquid crystal display device 20. Orientation films may be provided between the liquid crystal layer 6 and the pixel substrate 2 and between the liquid crystal layer 6 and the counter substrate 3, which are illustrated in FIG. 8.

The liquid crystal display device 20 has a configuration using the horizontal electric field mode, but may have a configuration using another display mode. For example, the liquid crystal display device 20 may have a configuration using a vertical electric field mode in which a vertical electric field is mainly generated between main surfaces of substrates, such as a twisted nematic (TN) mode, an optically compensated bend (OCB) mode, and a vertical aligned (VA) mode. In a display mode using the vertical electric field, for example, a configuration including the pixel electrodes 22 provided on the pixel substrate 2 and the drive electrodes COML provided on the counter substrate 3 can be employed.

The counter substrate 3 includes a second insulating substrate 31 and a color filter 32 formed on one surface of the second insulating substrate 31. The other surface of the second insulating substrate 31 is provided with a polarizing plate 35.

The method for mounting the color filter 32 may be what is called a color filter on array (COA) method of forming the color filter 32 on the pixel substrate 2 serving as an array substrate.

In the color filter 32 illustrated in FIG. 8, for example, color regions of the color filter colored in three colors of red (R), green (G), and blue (B) are cyclically arranged, and three color regions 32R, 32G, and 32B are associated with the respective sub-pixels SPix so that the color regions 32R, 32G, and 32B constitute the pixel Pix as one set.

The pixels Pix are arranged in a matrix along a direction parallel to the scan signal lines GCL and a direction parallel to the pixel signal lines SGL, and form the display area Ad (to be described later). The color filter 32 faces the liquid crystal layer 6 in the direction orthogonal to the TFT substrate 21. Thus, the sub-pixels SPix are allowed to display a single color.

The color filter 32 may have a combination of other colors as long as being colored in different colors. The color filter 32 may be omitted. Thus, there may be regions in which the color filter 32 is not provided, that is, there may be non-colored sub-pixels SPix. The pixel Pix may include four or more sub-pixels SPix.

The touch detection device 30 includes the third substrate 51 and the fourth substrate 52. An insulating layer 53 is provided between the third substrate 51 and the fourth substrate 52. The touch drive electrodes TL are formed on a surface on the fourth substrate 52 side of the third substrate 51. The touch detection electrodes TDL are formed on a surface on the third substrate 51 side of the fourth substrate 52. In the present configuration example, the touch drive electrodes TL are formed so as to extend along the direction parallel to the extending direction of the drive electrodes COML. The touch detection electrodes TDL are formed so as to extend along the direction intersecting the extending direction of the touch drive electrodes TL.

Figure 10:
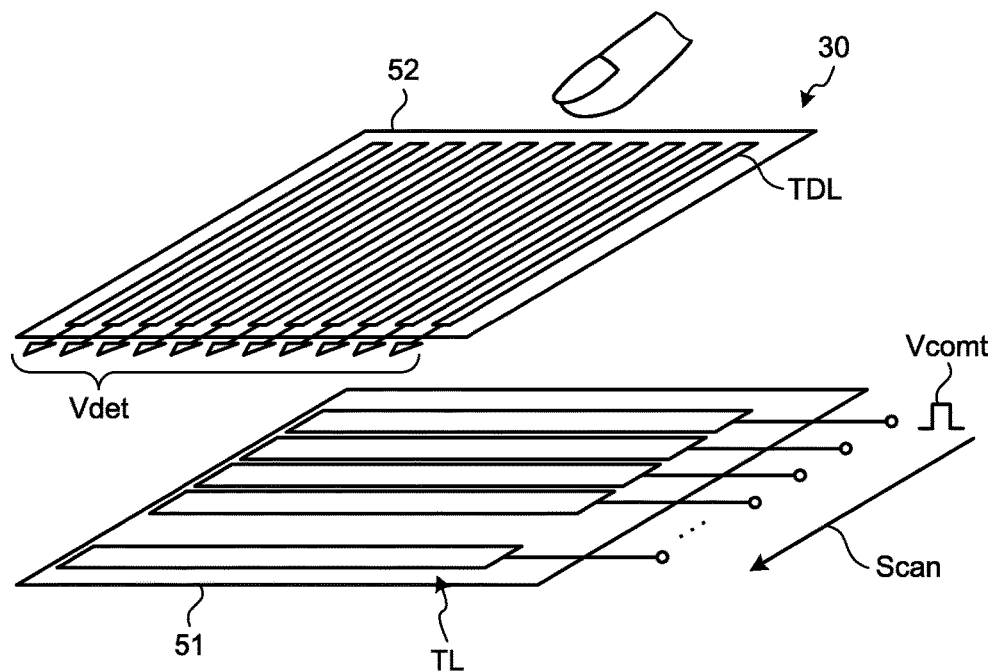
FIG. 10 is a perspective view illustrating a configuration example of drive electrodes and touch detection electrodes of the display unit with a touch detection function.

FIG. 10 is a perspective view illustrating a configuration example of the touch drive electrodes and the touch detection electrodes of the display unit with a touch detection function.

The touch detection device 30 is constituted by the touch drive electrodes TL provided on the third substrate 51 and the touch detection electrodes TDL provided on the fourth substrate 52.

The touch detection electrodes TDL are constituted by stripe-like electrode patterns extending in the direction intersecting the extending direction of electrode patterns of the touch drive electrodes TL. The touch detection electrodes TDL face the touch drive electrodes TL in the direction orthogonal to the surface of the third substrate 51. Each of the electrode patterns of the touch drive electrodes TL and the touch detection electrodes TDL is coupled to the touch detection controller 40.

The electrode patterns of the touch drive electrodes TL and the touch detection electrodes TDL intersecting each other generate electrostatic capacitances at intersecting portions therebetween. The touch detection device 30 performs the touch detection such that the touch detection controller 40 applies drive signals Vcomt to the touch drive electrodes TL, whereby the touch detection electrodes TDL output the touch detection signals Vdet.

In other words, each of the touch drive electrodes TL corresponds to the drive electrode E1, and each of the touch detection electrodes TDL corresponds to the touch detection electrode E2, in the basic principle of the touch detection illustrated in FIGS. 3 to 5. The touch detection device 30 is configured to detect the touch according to this basic principle.

In this manner, the touch detection device 30 includes the touch detection electrodes TDL that generate the electrostatic capacitances with the touch drive electrodes TL, and performs the touch detection based on a change in the electrostatic capacitances.

The electrode patterns of the touch drive electrodes TL and the touch detection electrodes TDL intersecting each other constitute capacitive touch sensors in a matrix arrangement. As a result, by scanning the entire input surface IS of the touch detection device 30, the touch detection controller 40 can detect positions and contact areas of places where the detection target object OBJ is in contact with or in proximity to the input surface IS.

In other words, when the touch detection device 30 performs the touch detection operation, the touch detection controller 40 performs driving so as to line-sequentially scan the touch drive electrodes TL illustrated in FIG. 10 in a time-division manner. This operation sequentially selects each of the touch drive electrodes TL in a scan direction Scan. In the touch detection device 30, the touch detection electrodes TDL outputs the touch detection signals Vdet. The touch detection device 30 is configured to perform the touch detection of each line in the above-described manner.

The touch drive electrodes TL correspond to first group electrodes of the present invention, and the touch detection electrodes correspond to second group electrodes of the present invention.

The shape of the touch detection electrodes TDL or the touch drive electrodes TL is not limited to the divided stripe-like shapes. The touch detection electrodes TDL or the touch drive electrodes TL may have, for example, a comb-tooth shape. The touch detection electrodes TDL or the touch drive electrodes TL only need to be divided into a plurality of portions. The shape of the slits dividing the touch detection electrodes TDL or the touch drive electrodes TL may be linear or curved.

As an example method of operation of the on-cell display device with a touch detection function 1, the display device with a touch detection function 1 can perform the touch detection operation (in a touch detection period) and the display operation (in a display operation period) at the same timing.

Figure 11:
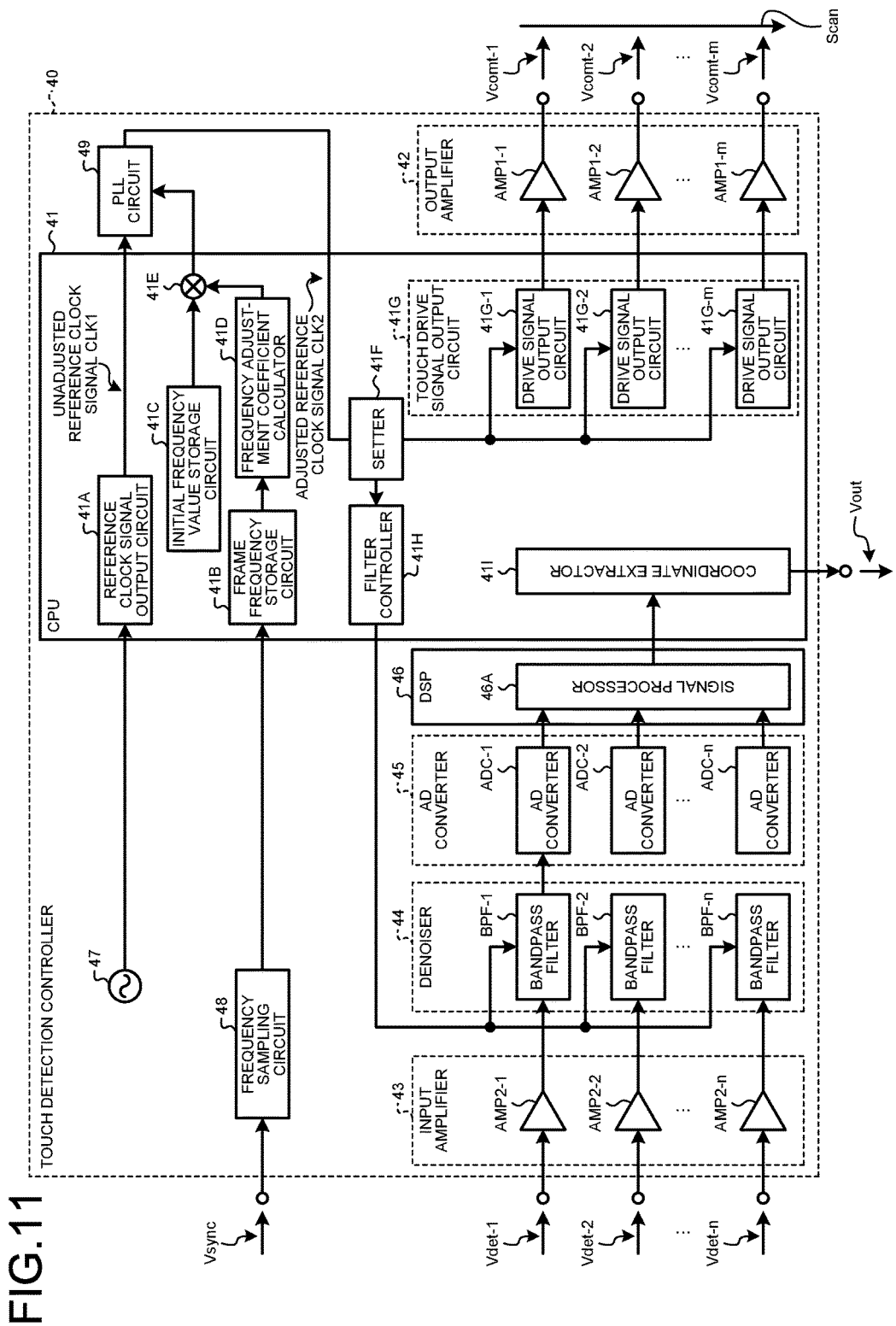
FIG. 11 is a diagram illustrating a configuration of a touch detection controller.

FIG. 11 is a diagram illustrating a configuration of the touch detection controller. The touch detection controller 40 includes a central processing unit (CPU) 41, an output amplifier 42, an input amplifier 43, a denoiser 44, an analog-digital (AD) converter 45, a digital signal processor (DSP) 46, an oscillator circuit 47, a frequency sampling circuit 48, and a phase-locked loop (PLL) circuit 49.

The CPU 41 includes a reference clock signal output circuit 41A, a frame frequency storage circuit 41B, an initial frequency value storage circuit 41C, a frequency adjustment coefficient calculator 41D, a multiplier 41E, a setter 41F, a touch drive signal output circuit 41G, a filter controller 41H, and a coordinate extractor 41I. The reference clock signal output circuit 41A, the frame frequency storage circuit 41B, the initial frequency value storage circuit 41C, the frequency adjustment coefficient calculator 41D, the multiplier 41E, the setter 41F, the touch drive signal output circuit 41G, the filter controller 41H, and the coordinate extractor 41I are implemented by the CPU 41 executing programs.

The DSP 46 includes a signal processor 46A. The signal processor 46A is implemented by the DSP 46 executing a program.

When the number of the touch drive electrodes TL is m (m is an integer equal to or larger than 1), the touch drive signal output circuit 41G includes m drive signal output circuits 41G-1 to 41G-m, accordingly. The drive signal output circuits 41G-1 to 41G-m sequentially output the touch drive signals Vcomt-1 to Vcomt-m that have the same frequency set by the setter 41F, to the output amplifier 42, along the scan direction Scan (refer to FIG. 10).

When the number of the touch drive electrodes TL is m, the output amplifier 42 includes m amplifiers AMP1-1 to AMP1-$m$, accordingly. The amplifiers AMP1-1 to AMP1-$m$ amplify the touch drive signals Vcomt-1 to Vcomt-m that are sequentially supplied along the scan direction Scan (refer to FIG. 10) from the drive signal output circuits 41G-1 to 41G-m, and sequentially output the results to the m touch drive electrodes TL.

When the number of the touch detection electrodes TDL is n (n is an integer equal to or larger than 1), the input amplifier 43 includes n amplifiers AMP2-1 to AMP2-$n$, accordingly. The amplifiers AMP2-1 to AMP2-$n$ amplify the touch detection signals Vdet-1 to Vdet-n that are supplied all at once from the n touch detection electrodes TDL, and output the results to the denoiser 44.

When the number of the touch detection electrodes TDL is n, the denoiser 44 includes n band-pass filters BPF-1 to BPF-n, accordingly. The band-pass filters BPF-1 to BPF-n pass signals within a passing frequency band set by the filter controller 41H while removing signals in the other frequency bands from among the signals supplied from the amplifiers AMP2-1 to AMP2-$n$, and output the passed signals to the AD converter 45. Examples of the band-pass filters BPF-1 to BPF-n include, but are not limited to, switched capacitors.

When the number of the touch detection electrodes TDL is n, the AD converter 45 includes n AD converters ADC-1 to ADC-n, accordingly. The AD converters ADC-1 to ADC-n convert analog signals supplied from the band-pass filters BPF-1 to BPF-n into digital signals, and outputs the results to the signal processor 46A.

Based on the digital signals supplied from the AD converters ADC-1 to ADC-n, the signal processor 46A detects whether there is a touch on the touch detection device 30, and outputs the result to the coordinate extractor 41I.

When the signal processor 46A has detected the touch, the coordinate extractor 41I obtains the coordinates of the touch, and outputs a signal Vout including the coordinates to the host HST.

The oscillator circuit 47 outputs an alternating current (AC) signal. A reference clock signal that serves as a reference for operations of components of the touch detection controller 40 is based on this AC signal. The AC signal may be a square wave or a sine wave. The AC signal has, for example, a frequency on the order of megahertz.

The frequency sampling circuit 48 samples the vertical synchronizing signal Vsync supplied from the display controller 11 to measure the frame frequency of the display controller 11.

The reference clock signal output circuit 41A outputs an unadjusted reference clock signal CLK1 based the AC signal supplied from the oscillator circuit 47. The unadjusted reference clock signal CLK1 has, for example, a frequency on the order of megahertz.

The frame frequency storage circuit 41B stores the frame frequency supplied from the frequency sampling circuit 48. The frame frequency is the number of times that frames are displayed in a unit time (such as one second).

The initial frequency value storage circuit 41C stores the initial value (design value) of the frequency of the unadjusted reference clock signal CLK1. The initial value (design value) of the frequency of the unadjusted reference clock signal CLK1 is, for example, 200 kHz.

The frequency adjustment coefficient calculator 41D calculates, based on the frame frequency stored in the frame frequency storage circuit 41B, an adjustment coefficient for adjusting the unadjusted reference clock signal CLK1. For example, the frequency adjustment coefficient calculator 41D calculates the adjustment coefficient that is greater than one when the frame frequency has increased, and calculates the adjustment coefficient that is smaller than one when the frame frequency has decreased.

The multiplier 41E multiplies the initial value (design value) of the frequency of the unadjusted reference clock signal CLK1 stored in the initial frequency value storage circuit 41C by the adjustment coefficient calculated by the frequency adjustment coefficient calculator 41D.

Based on the multiplied value supplied from the multiplier 41E, the PLL circuit 49 adjusts the unadjusted reference clock signal CLK1 supplied from the reference clock signal output circuit 41A, and outputs the adjusted reference clock signal CLK2. The adjusted reference clock signal CLK2 has, for example, a frequency on the order of megahertz. The components of the touch detection controller 40 operate at an operating frequency based on the adjusted reference clock signal CLK2.

Based on the adjusted reference clock signal CLK2, the setter 41F sets the frequencies of the touch drive signals Vcomt-1 to Vcomt-m to the drive signal output circuits 41G-1 to 41G-m. The drive signal output circuits 41G-1 to 41G-m sequentially output the touch drive signals Vcomt-1 to Vcomt-m having the same frequency set by the setter 41F, to the output amplifier 42, along the scan direction Scan (refer to FIG. 10).

Based on the adjusted reference clock signal CLK2, the setter 41F sets the frequency band for passing the signals to the band-pass filters BPF-1 to BPF-n. The frequency band for passing the signals includes the frequencies of the touch drive signals Vcomt-1 to Vcomt-m.

The band-pass filters BPF-1 to BPF-n pass the signals within the passing frequency band set by the filter controller 41H while removing the signals in the other frequency bands from among the signals supplied from the amplifiers AMP2-1 to AMP2-n, and output the passed signals to the AD converter 45. If the band-pass filters BPF-1 to BPF-n are switched capacitors or the like, the setter 41F can control the passing frequency band of the band-pass filters BPF-1 to BPF-n by controlling switching signals for controlling switches in the switched capacitors.

Overview of Operation of Display Device with Touch Detection Function

The display controller 11 includes a display clock signal generator for generating a display clock signal, and operates at an operating frequency based on the display clock signal to display the image on the liquid crystal display device 20. The present embodiment assumes that the frame frequency of the display controller 11 is set to 60 Hz at the time of design.

The display controller 11 outputs the scan signals Vscan to the scan signal lines GCL, and outputs the pixel signals Vpix to the pixel signal lines SGL. Noise caused by the scan signals Vscan and the pixel signals Vpix propagates from the liquid crystal display device 20 to the touch detection device 30.

Figure 12:
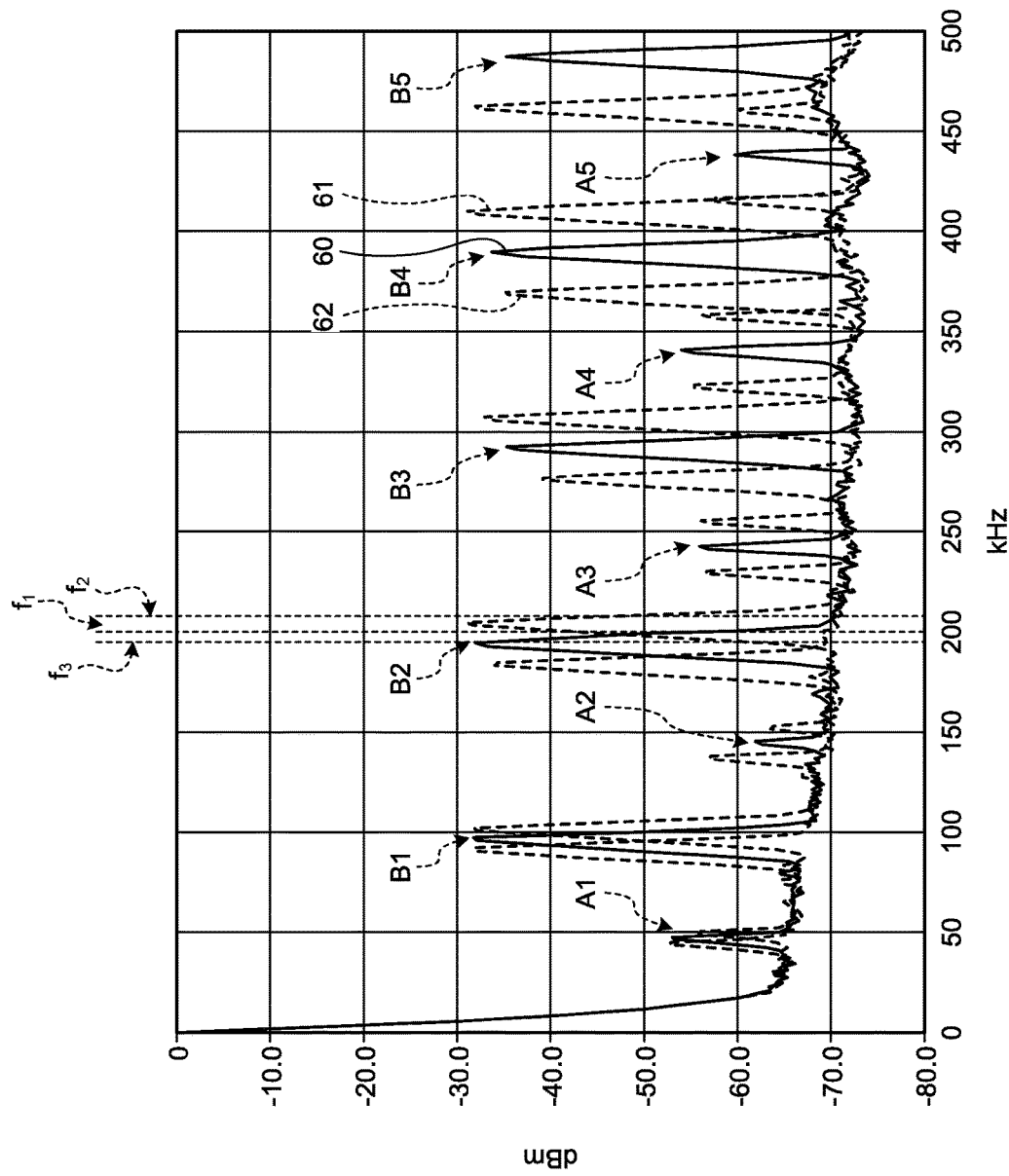
FIG. 12 is a diagram illustrating noise propagating from the liquid crystal display device to the touch detection device.

FIG. 12 is a diagram illustrating the noise propagating from the liquid crystal display device to the touch detection device. In FIG. 12, the horizontal axis represents the frequency of the noise, and the vertical axis represents the level (absolute value) of the noise.

In the graph of FIG. 12, a line 60 represents the noise propagating from the liquid crystal display device 20 to the touch detection device 30 when the frame frequency of the display controller 11 is 60 Hz. The line 60 has local maxima A1 to A5 and B1 to B5. The local maxima A1 to A5 mainly attribute to by the scan signals Vscan. The local maximum A1 corresponds to the fundamental harmonic, and the local maxima A2 to A5 correspond to higher harmonics. The local maxima B1 to B5 mainly attribute to the pixel signals Vpix. The local maximum B1 corresponds to the fundamental harmonic, and the local maxima B2 to B5 correspond to higher harmonics.

The levels (amplitudes) of the local maxima B1 to B5 are relatively larger than those of the local maxima A1 to A5 because the pixel signals Vpix, which are the main cause of the local maxima B1 to B5, vary in a voltage range of −5 V to +5 V, i.e., an increase/decrease width of 10 v, whereas the scan signals Vscan, which are the main cause of the local maxima A1 to A5, vary in a voltage range of 0 V to +6 V, i.e., an increase/decrease width of 6 v.

In the present embodiment, the pixels Pix are arranged in a 1920×1080 matrix. The frequencies of the local maxima B1 to B5 mainly attributing to the pixel signals Vpix are determined according to the product of the frame frequency 60 Hz and the number of pixels 1920 in one direction. The frequencies of the local maxima A1 to A5 mainly attributing to the scan signals Vscan are determined according to the product of the frame frequency 60 Hz, the number of pixels 1920 in one direction, the number of pixels 1080 in the other direction, and the number of the sub-pixels SPix (such as 3 or 4) in one pixel Pix.

If the frequency of the touch drive signals Vcomt overlaps or approximates any of the frequencies of the local maxima A1 to A5 and B1 to B5, large noise is superimposed on the touch detection signals Vdet. If the large noise is superimposed on the touch detection signals Vdet, the touch detection controller 40 cannot appropriately perform the touch detection.

If the touch detection signals Vdet are reduced in voltage by the influence of the noise (with negative noise superimposed thereon), the touch detection controller 40 may detect what is called a ghost touch in which the detection target object OBJ is falsely detected as being in proximity to or in contact with the detection surface IS even through the detection target object OBJ is not in proximity to or in contact with the detection surface IS.

If the touch detection signals Vdet are increased in voltage by the influence of the noise (with positive noise superimposed thereon), the touch detection controller 40 may become what is called an insensitive state in which the touch cannot be detected even through the detection target object OBJ is in proximity to or in contact with the detection surface IS.

To solve these problems, the touch detection controller 40 sets the frequency of the touch drive signals Vcomt and the passing frequency band of the denoiser 44 away from the frequencies of the local maxima A1 to A5 and B1 to B5 so as to be able to appropriately perform the touch detection.

For example, the frequency of the local maximum B2 is approximately 180 kHz. Accordingly, the touch detection controller 40 sets a frequency $f_1$ of the touch drive signals Vcomt to, for example, 200 kHz, and sets the passing frequency band of the denoiser 44 to a range including the frequency $f_1$ (such as 200 kHz±5 kHz) so as to be able to reduce the influence of the noise at the local maximum B2 and thus to appropriately perform the touch detection.

Accordingly, at the time of design, the oscillator circuit 47 and the reference clock signal output circuit 41A are initially set so as to output the unadjusted reference clock signal CLK1 for allowing the touch drive signal output circuit 41G to output the touch drive signals Vcomt at 200 kHz and for controlling the denoiser 44 to pass the signals in the frequency band of 200 kHz±5 kHz. The initial frequency value storage circuit 41C is initially set so as to store "200 kHz". The frequency adjustment coefficient calculator 41D is initially set so as to calculate the frequency adjustment coefficient to be "1".

The multiplier 41E multiplies the initial frequency value of "200 kHz" by the frequency adjustment coefficient of "1" to calculate "200 kHz". Accordingly, the PLL circuit 49 outputs the adjusted reference clock signal CLK2 for allowing the touch drive signal output circuit 41G to output the touch drive signals Vcomt at 200 kHz and for controlling the denoiser 44 to pass the signals in the frequency band of 200 kHz±5 kHz.

Based on the adjusted reference clock signal CLK2, the setter 41F sets the frequency "200 kHz" of the touch drive signals Vcomt-1 to Vcomt-m to the drive signal output circuits 41G-1 to 41G-m. The drive signal output circuits 41G-1 to 41G-m sequentially output the touch drive signals Vcomt-1 to Vcomt-m having the frequency of "200 kHz" set by the setter 41F, to the output amplifier 42, along the scan direction Scan (refer to FIG. 10).

Based on the adjusted reference clock signal CLK2, the setter 41F sets the frequency band of "200 kHz±5 kHz" to the band-pass filters BPF-1 to BPF-n. The frequency band of "200 kHz±5 kHz" includes the frequency "200 kHz" of the touch drive signals Vcomt-1 to Vcomt-m. The band-pass filters BPF-1 to BPF-n pass the signals in the frequency band of "200 kHz±5 kHz" while removing the signals in the other frequency bands from among the signals supplied from the amplifiers AMP2-1 to AMP2-n, and output the passed signals to the AD converter 45.

At the time of design, the touch detection controller 40 is initially set as described above, and can appropriately perform the touch detection.

The actual value of the frame frequency of the display controller 11 may deviate from the design value of 60 Hz due to individual differences or temperature drift of the display controller 11.

In the graph of FIG. 12, a line 61 represents the noise propagating from the liquid crystal display device 20 to the touch detection device 30 when the frame frequency of the display controller 11 is 63 Hz. A line 62 represents the noise propagating from the liquid crystal display device 20 to the touch detection device 30 when the frame frequency of the display controller 11 is 57 Hz.

The inventors of the present invention have found that the frame frequency is correlated with the frequency of the noise propagating from the liquid crystal display device 20 to the touch detection device 30. That is, the inventors of the present invention have found that an increase in the frame frequency increases the frequency of the noise propagating from the liquid crystal display device 20 to the touch detection device 30, and a reduction in the frame frequency reduces the frequency of the noise propagating from the liquid crystal display device 20 to the touch detection device 30.

When the actual value of the frame frequency of the display controller 11 is 63 Hz, the frequency of the local maximum B2 is shifted to approximately 205 kHz. The actual value 63 Hz of the frame frequency of the display controller 11 is 1.05 times the design value of 60 Hz. Accordingly, the touch detection controller 40 sets a frequency $f_2$ of the touch drive signals Vcomt to a value (such as 210 kHz) 1.05 times the frequency $f_1$ (such as 200 kHz), and sets the passing frequency band of the denoiser 44 to a range (such as 210 kHz±5 kHz) including the frequency $f_2$. By performing these settings, the touch detection controller 40 can reduce the influence of the noise at the local maxima B2 and A3, and thus can appropriately perform the touch detection.

When the actual value of the frame frequency of the display controller 11 is 57 Hz, the frequency of the local maximum B2 is shifted to approximately 165 kHz. The actual value 57 Hz of the frame frequency of the display controller 11 is 0.95 times the design value of 60 Hz. Accordingly, the touch detection controller 40 sets a frequency $f_3$ of the touch drive signals Vcomt to a value (such as 190 kHz) 0.95 times the frequency $f_1$ (such as 200 kHz), and sets the passing frequency band of the denoiser 44 to a range (such as 190 kHz±5 kHz) including the frequency $f_3$. By performing these settings, the touch detection controller 40 can reduce the influence of the noise at the local maxima B2 and A3, and thus can appropriately perform the touch detection.

The above has described the case where the actual value of the frame frequency of the display controller 11 deviates from the design value of 60 Hz, and the touch detection controller 40 operates at the operating frequency as designed. However, a case can be considered where the actual value of the frame frequency of the display controller 11 is 60 Hz as designed, but the operating frequency of the touch detection controller 40 deviates from the design value due to individual differences or temperature drift thereof. This case can be considered in the same manner as the case described above.

The components of the touch detection controller 40 operate at the operating frequency based on the adjusted reference clock signal CLK2 of the touch detection controller 40 itself. Accordingly, if the frequency of the adjusted reference clock signal CLK2 of the touch detection controller 40 is lower by 5% than the design value thereof, the components of the touch detection controller 40 operate at an operating frequency lower by 5% than the design value thereof. This causes the frequency sampling circuit 48 to measure the frame frequency of the display controller 11 to be higher by 5% than the actual value of 60 Hz. That is, the frequency sampling circuit 48 measures the frame frequency of the display controller 11 to be 63 Hz, despite the actual value being 60 Hz.

To solve this problem, the touch detection controller 40 sets the frequency of the touch drive signals Vcomt to a value (such as 210 kHz) 1.05 times the design value (such as 200 kHz), and sets the passing frequency band of the denoiser 44 to a range (such as 210 kHz±5 kHz) including the frequency of the touch drive signals Vcomt. Since the components of the touch detection controller 40 operate at the operating frequency lower by 5% than the design value thereof, the touch drive signals Vcomt have an actual frequency value of 200 kHz that is lower by 5% than the setting value of 210 kHz, so that the actual value for the passing frequency band of the denoiser 44 is 200 kHz±5 kHz that is lower by 5% than the setting value of 210 kHz±5 kHz. In this manner, the touch detection controller 40 can reduce the influence of the noise at the local maxima B2 and A3, and thus can appropriately perform the touch detection.

If the frequency of the adjusted reference clock signal CLK2 of the touch detection controller 40 is higher by 5% than the design value thereof, the components of the touch detection controller 40 operate at an operating frequency higher by 5% than the design value thereof. This causes the frequency sampling circuit 48 to measure the frame frequency of the display controller 11 to be lower by 5% than the actual value of 60 Hz. That is, the frequency sampling circuit 48 measures the frame frequency of the display controller 11 to be 57 Hz, despite the actual value being 60 Hz.

To solve this problem, the touch detection controller 40 sets the frequency of the touch drive signals Vcomt to a value (such as 190 kHz) 0.95 times the design value (such as 200 kHz), and sets the passing frequency band of the denoiser 44 to a range (such as 190 kHz±5 kHz) including the frequency of the touch drive signals Vcomt. Since the components of the touch detection controller 40 operate at the operating frequency higher by approximately 5% than the design value thereof, the touch drive signals Vcomt have an actual frequency value of 200 kHz that is higher by 5% than the setting value of 190 kHz, so that the actual value for the passing frequency band of the denoiser 44 is 200 kHz±5 kHz that is higher by 5% than the setting value of 190 kHz±5 kHz. In this manner, the touch detection controller 40 can reduce the influence of the noise at the local maxima B2 and A3, and thus can appropriately perform the touch detection.

The same consideration as described above can be made for a case where the frame frequency of the display controller 11 deviates from the design value of 60 Hz, and the operating frequency of the touch detection controller 40 deviates from the design value.

That is, the touch detection controller 40 operates at the operating frequency based on the adjusted reference clock signal CLK2 of the touch detection controller 40 itself, and measures the frame frequency of the display controller 11 relative to the operating frequency of the touch detection controller 40 itself. Based on the measurement value of the frame frequency of the display controller 11 relative to the operating frequency of the touch detection controller 40 itself, the touch detection controller 40 sets the frequency of the touch drive signals Vcomt and the passing frequency band of the denoiser 44. In this manner, the touch detection controller 40 can reduce the influence of the noise at the local maxima B2 and A3, and thus can appropriately perform the touch detection.

Operation of Touch Detection Controller

FIG. 13 is a flowchart illustrating an operation of the touch detection controller. The touch detection controller 40 may execute the processing illustrated in FIG. 13 when a device provided with the display device with a touch detection function 1 is powered on or released from a sleep mode. The touch detection controller 40 may execute the processing illustrated in FIG. 13 at regular intervals in consideration of temperature drift of the device provided with the display device with a touch detection function 1.

At Step S100, the frequency sampling circuit 48 measures the frame frequency of the display controller 11 by sampling the vertical synchronizing signal Vsync supplied from the display controller 11, and outputs the measurement result to the frame frequency storage circuit 41B. The frame frequency storage circuit 41B stores the frame frequency.

At Step S102, the frequency adjustment coefficient calculator 41D calculates, based on the frame frequency stored in the frame frequency storage circuit 41B, the frequency adjustment coefficient that is a ratio of the measurement value of the frame frequency to the design value of the frame frequency. For example, when the measurement value of the frame frequency is 63 Hz, the frequency adjustment coefficient calculator 41D calculates the frequency adjustment coefficient corresponding to the ratio of the measurement value 63 Hz of the frame frequency to the design value 60 Hz of the frame frequency to be "1.05".

At Step S104, the multiplier 41E multiplies the initial frequency value stored in the initial frequency value storage circuit 41C by the frequency adjustment coefficient calculated by the frequency adjustment coefficient calculator 41D. The multiplier 41E controls the PLL circuit 49 so as to adjust the unadjusted reference clock signal CLK1 based on the multiplication result. The PLL circuit 49 outputs the adjusted reference clock signal CLK2 that has been adjusted from the unadjusted reference clock signal CLK1 to the components of the touch detection controller 40.

For example, the multiplier 41E multiplies the initial frequency value of "200 kHz" stored in the initial frequency value storage circuit 41C by the frequency adjustment coefficient of "1.05" calculated by the frequency adjustment coefficient calculator 41D to obtain the multiplication result of "210 kHz". The multiplier 41E controls the PLL circuit 49 to adjust the unadjusted reference clock signal CLK1 to the adjusted reference clock signal CLK2 so that the touch drive signal output circuit 41G can output the touch drive signals Vcomt at 210 kHz, and so that the denoiser 44 can pass the signals in the frequency band of 210 kHz±5 kHz. For example, the PLL circuit 49 outputs, to the components of the touch detection controller 40, the adjusted reference clock signal CLK2 that enables the output of the touch drive signals Vcomt at 210 kHz, and that enables the denoiser 44 to pass the signals in the frequency band of 210 kHz±5 kHz.

At Step S106, the setter 41F calculates the passing frequency band (such as 210 kHz±5 kHz) of the band-pass filters BPF-1 to BPF-n based on the adjusted reference clock signal CLK2.

At Step S108, the setter 41F sets the frequency (such as 210 kHz) of the touch drive signals Vcomt-1 to Vcomt-m to the drive signal output circuits 41G-1 to 41G-m based on the adjusted reference clock signal CLK2.

At Step S110, the setter 41F sets the passing frequency band calculated at Step S106 to the band-pass filters BPF-1 to BPF-n.

At Step S112, the touch detection controller 40 performs the touch detection by outputting the touch drive signals Vcomt-1 to Vcomt-m having the frequency (such as 210 kHz) set at Step S108 to the touch detection device 30, and by detecting the touch detection signals Vdet-1 to Vdet-n in the passing frequency band set at Step S110.

Setting Examples of Touch Detection Controller

FIG. 14 is a diagram illustrating setting examples of the touch detection controller. The first row of a table 70 represents design values of the touch detection controller 40. The second to ninth rows of the table 70 represent Examples 1 to 8 of setting values for frequencies of the touch drive signals Vcomt of the touch detection controller 40 and for the passing frequency bands of the band-pass filters BPF-1 to BPF-n.

The first column of the first row in the table 70 indicates that the increase/decrease amount from the design value of the frame frequency is "0%" if the frame frequency of the display controller 11 is equal to the design value thereof (such as 60 Hz).

The second column of the first row in the table 70 indicates that the increase/decrease amount from the design value of the operating frequency of the touch detection controller 40 is "0%" if the operating frequency of the touch detection controller 40 is equal to the design value thereof.

The third column of the first row in the table 70 indicates that the measurement value of the frame frequency of the display controller 11 measured by the frequency sampling circuit 48 is "60 Hz" if the frame frequency of the display controller 11 is equal to the design value thereof, and the operating frequency of the touch detection controller 40 is equal to the design value thereof.

The fourth column of the first row in the table 70 indicates that the frequency adjustment coefficient calculated by the frequency adjustment coefficient calculator 41D is "1". As described above, if the measurement value of the frame frequency is "60 Hz", the frequency adjustment coefficient calculator 41D calculates the frequency adjustment coefficient corresponding to the ratio of the measurement value "60 Hz" of the frame frequency to the design value 60 Hz of the frame frequency to be "1".

The fifth column of the first row in the table 70 indicates that the setting value for the frequency of the touch drive signals Vcomt-1 to Vcomt-m set by the setter 41F is "200 kHz". The sixth column of the first row in the table 70 indicates that the setting value for the passing frequency band of the band-pass filters BPF-1 to BPF-n set by the setter 41F is "200 kHz±5 kHz".

As described above, if the frame frequency of the display controller 11 is equal to the design value thereof, and the operating frequency of the touch detection controller 40 is equal to the design value thereof, the touch detection controller 40 sets the frequency of the touch drive signals Vcomt-1 to Vcomt-m to "200 kHz", and sets the passing frequency band of the band-pass filters BPF-1 to BPF-n to "200 kHz±5 kHz". By performing these settings, the touch detection controller 40 can reduce the influence of the noise at the local maxima B2 and A3, and thus can appropriately perform the touch detection.

The first column of Example 1 (second row) in the table 70 indicates that the actual value of the frame frequency of the display controller 11 is 63 Hz, and that the increase/decrease amount of the actual value 63 Hz of the frame frequency from the design value 60 Hz of the frame frequency is "5%".

The second column of Example 1 (second row) in the table 70 indicates that the operating frequency of the touch detection controller 40 is equal to the design value thereof, and that the increase/decrease amount of the actual value of the operating frequency of the touch detection controller 40 from the design value of the operating frequency of the touch detection controller 40 is "0%.

The third column of Example 1 (second row) in the table 70 indicates that the measurement value of the frame frequency of the display controller 11 measured by the frequency sampling circuit 48 is "63 Hz".

The fourth column of Example 1 (second row) in the table 70 indicates that the frequency adjustment coefficient calculated by the frequency adjustment coefficient calculator 41D is "1.05". As described above, when the measurement value of the frame frequency is 63 Hz, the frequency adjustment coefficient calculator 41D calculates the frequency adjustment coefficient corresponding to the ratio of the measurement value 63 Hz of the frame frequency to the design value 60 Hz of the frame frequency to be "1.05".

The fifth column of Example 1 (second row) in the table 70 indicates that the setting value for the frequency of the touch drive signals Vcomt-1 to Vcomt-m set by the setter 41F is "210 kHz". The sixth column of Example 1 (second row) in the table 70 indicates that the setting value for the passing frequency band of the band-pass filters BPF-1 to BPF-n set by the setter 41F is "210 kHz±5 kHz".

As described above, if the measurement value (equal to the actual value, in Example 1) of the frame frequency of the display controller 11 is 63 Hz, and the touch detection controller 40 operates at the operating frequency as designed, the touch detection controller 40 sets the frequency of the touch drive signals Vcomt-1 to Vcomt-m to "210 kHz", and sets the passing frequency band of the band-pass filters BPF-1 to BPF-n to "210 kHz±5 kHz". By performing these settings, the touch detection controller 40 can reduce the influence of the noise at the local maxima B2 and A3, and thus can appropriately perform the touch detection.

The first column of Example 2 (third row) in the table 70 indicates that the actual value of the frame frequency of the display controller 11 is 57 Hz, and that the increase/decrease amount of the actual value 57 Hz of the frame frequency from the design value 60 Hz of the frame frequency is "−5%".

The second column of Example 2 (third row) in the table 70 indicates that the operating frequency of the touch detection controller 40 is equal to the design value thereof, and that the increase/decrease amount of the actual value of the operating frequency of the touch detection controller 40 from the design value of the operating frequency of the touch detection controller 40 is "0%.

The third column of Example 2 (third row) in the table 70 indicates that the measurement value of the frame frequency of the display controller 11 measured by the frequency sampling circuit 48 is "57 Hz".

The fourth column of Example 2 (third row) in the table 70 indicates that the frequency adjustment coefficient calculated by the frequency adjustment coefficient calculator 41D is "0.95". As described above, when the measurement value of the frame frequency is "57 Hz", the frequency adjustment coefficient calculator 41D calculates the frequency adjustment coefficient corresponding to the ratio of the measurement value "57 Hz" of the frame frequency to the design value 60 Hz of the frame frequency to be "0.95".

The fifth column of Example 2 (third row) in the table 70 indicates that the setting value for the frequency of the touch drive signals Vcomt-1 to Vcomt-m set by the setter 41F is "190 kHz". The sixth column of Example 2 (third row) in the table 70 indicates that the setting value for the passing frequency band of the band-pass filters BPF-1 to BPF-n set by the setter 41F is "190 kHz±5 kHz".

As described above, if the measurement value (equal to the actual value, in Example 2) of the frame frequency of the display controller 11 is 57 Hz, and the touch detection controller 40 operates at the operating frequency as designed, the touch detection controller 40 sets the frequency of the touch drive signals Vcomt-1 to Vcomt-m to "190 kHz", and sets the passing frequency band of the band-pass filters BPF-1 to BPF-n to "190 kHz±5 kHz". By performing these settings, the touch detection controller 40 can reduce the influence of the noise at the local maxima B2 and A3, and thus can appropriately perform the touch detection.

The first column of Example 3 (fourth row) in the table 70 indicates that the actual value of the frame frequency of the display controller 11 is 60 Hz, and that the increase/decrease amount of the actual value 60 Hz of the frame frequency from the design value 60 Hz of the frame frequency is "0%".

The second column of Example 3 (fourth row) in the table 70 indicates that the operating frequency of the touch detection controller 40 is higher than the design value thereof, and that the increase/decrease amount of the actual value of the operating frequency of the touch detection controller 40 from the design value of the operating frequency of the touch detection controller 40 is "5%.

The third column of Example 3 (fourth row) in the table 70 indicates that the measurement value of the frame frequency of the display controller 11 measured by the frequency sampling circuit 48 is "57 Hz". As described above, when the operating frequency of the touch detection controller 40 is higher by 5% than the design value thereof, the frequency sampling circuit 48 measures the frame frequency of the display controller 11 to be the measurement value of "57 Hz" that is lower by 5% than the actual value of 60 Hz.

The fourth column of Example 3 (fourth row) in the table 70 indicates that the frequency adjustment coefficient calculated by the frequency adjustment coefficient calculator 41D is "0.95". As described above, when the measurement value of the frame frequency is "57 Hz", the frequency adjustment coefficient calculator 41D calculates the frequency adjustment coefficient corresponding to the ratio of the measurement value "57 Hz" of the frame frequency to the design value 60 Hz of the frame frequency to be "0.95".

The fifth column of Example 3 (fourth row) in the table 70 indicates that the setting value for the frequency of the touch drive signals Vcomt-1 to Vcomt-m set by the setter 41F is "190 kHz". The sixth column of Example 3 (fourth row) in the table 70 indicates that the setting value for the passing frequency band of the band-pass filters BPF-1 to BPF-n set by the setter 41F is "190 kHz±5 kHz".

As described above, when the actual value of the frame frequency of the display controller 11 is 60 Hz, the touch detection controller 40 can reduce the influence of the noise at the local maxima B2 and A3 and appropriately perform the touch detection by setting the frequency of the touch drive signals Vcomt-1 to Vcomt-m to "200 kHz", and setting the passing frequency band of the band-pass filters BPF-1 to BPF-n to "200 kHz±5 kHz".

In Example 3, however, the touch detection controller 40 operates at the operating frequency higher by 5% than the design value thereof. Accordingly, when the setter 41F sets the frequency of the touch drive signals Vcomt-1 to Vcomt-m to "190 kHz", the drive signal output circuits 41G-1 to 41G-m output the touch drive signals Vcomt-1 to Vcomt-m at a frequency of 200 kHz that is higher by 5% than "190 kHz". In the same manner, when the setter 41F sets the passing frequency band of the band-pass filters BPF-1 to BPF-n to "190 kHz±5 kHz", the band-pass filters BPF-1 to BPF-n pass the signals at a frequency of 200 kHz±5 kHz that is higher by 5% than "190 kHz±5 kHz". In this manner, the touch detection controller 40 can reduce the influence of the noise at the local maxima B2 and A3, and thus can appropriately perform the touch detection.

The first column of Example 4 (fifth row) in the table 70 indicates that the actual value of the frame frequency of the display controller 11 is 60 Hz, and that the increase/decrease amount of the actual value 60 Hz of the frame frequency from the design value 60 Hz of the frame frequency is "0%".

The second column of Example 4 (fifth row) in the table 70 indicates that the operating frequency of the touch detection controller 40 is lower than the design value thereof, and that the increase/decrease amount of the actual value of the operating frequency of the touch detection controller 40 from the design value of the operating frequency of the touch detection controller 40 is "−5%".

The third column of Example 4 (fifth row) in the table 70 indicates that the measurement value of the frame frequency of the display controller 11 measured by the frequency sampling circuit 48 is "63 Hz". As described above, when the operating frequency of the touch detection controller 40 is lower by 5% than the design value thereof, the frequency sampling circuit 48 measures the frame frequency of the display controller 11 to be the measurement value of "63 Hz" that is higher by 5% than the actual value of 60 Hz.

The fourth column of Example 4 (fifth row) in the table 70 indicates that the frequency adjustment coefficient calculated by the frequency adjustment coefficient calculator 41D is "1.05". As described above, when the measurement value of the frame frequency is "63 Hz", the frequency adjustment coefficient calculator 41D calculates the frequency adjustment coefficient corresponding to the ratio of the measurement value "63 Hz" of the frame frequency to the design value 60 Hz of the frame frequency to be "1.05".

The fifth column of Example 4 (fifth row) in the table 70 indicates that the setting value for the frequency of the touch drive signals Vcomt-1 to Vcomt-m set by the setter 41F is "210 kHz". The sixth column of Example 4 (fifth row) in the table 70 indicates that the setting value for the passing frequency band of the band-pass filters BPF-1 to BPF-n set by the setter 41F is "210 kHz±5 kHz".

As described above, when the actual value of the frame frequency of the display controller 11 is 60 Hz, the touch detection controller 40 can reduce the influence of the noise at the local maxima B2 and A3 and appropriately perform the touch detection by setting the frequency of the touch drive signals Vcomt-1 to Vcomt-m to "200 kHz", and setting the passing frequency band of the band-pass filters BPF-1 to BPF-n to "200 kHz±5 kHz".

In Example 4, however, the touch detection controller 40 operates at the operating frequency lower by 5% than the design value thereof. Accordingly, when the setter 41F sets the frequency of the touch drive signals Vcomt-1 to Vcomt-m to "210 kHz", the drive signal output circuits 41G-1 to 41G-m output the touch drive signals Vcomt-1 to Vcomt-m at a frequency of 200 kHz that is lower by 5% than "210 kHz". In the same manner, when the setter 41F sets the passing frequency band of the band-pass filters BPF-1 to BPF-n to "210 kHz±5 kHz", the band-pass filters BPF-1 to BPF-n pass the signals at a frequency of 200 kHz±5 kHz that is lower by 5% than "210 kHz±5 kHz". In this manner, the touch detection controller 40 can reduce the influence of the noise at the local maxima B2 and A3, and thus can appropriately perform the touch detection.

The first column of Example 5 (sixth row) in the table 70 indicates that the actual value of the frame frequency of the display controller 11 is 63 Hz, and that the increase/decrease amount of the actual value 63 Hz of the frame frequency from the design value 60 Hz of the frame frequency is "5%".

The second column of Example 5 (sixth row) in the table 70 indicates that the operating frequency of the touch detection controller 40 is higher than the design value thereof, and that the increase/decrease amount of the actual value of the operating frequency of the touch detection controller 40 from the design value of the operating frequency of the touch detection controller 40 is "5%".

The third column of Example 5 (sixth row) in the table 70 indicates that the measurement value of the frame frequency of the display controller 11 measured by the frequency sampling circuit 48 is "60 Hz". As described above, when the operating frequency of the touch detection controller 40 is higher by 5% than the design value thereof, the frequency sampling circuit 48 measures the frame frequency of the display controller 11 to be the measurement value of "60 Hz" that is lower by 5% than the actual value of 63 Hz.

The fourth column of Example 5 (sixth row) in the table 70 indicates that the frequency adjustment coefficient calculated by the frequency adjustment coefficient calculator 41D is "1". As described above, if the measurement value of the frame frequency is "60 Hz", the frequency adjustment coefficient calculator 41D calculates the frequency adjustment coefficient corresponding to the ratio of the measurement value "60 Hz" of the frame frequency to the design value 60 Hz of the frame frequency to be "1".

The fifth column of Example 5 (sixth row) in the table 70 indicates that the setting value for the frequency of the touch drive signals Vcomt-1 to Vcomt-m set by the setter 41F is "200 kHz". The sixth column of Example 5 (sixth row) in the table 70 indicates that the setting value for the passing frequency band of the band-pass filters BPF-1 to BPF-n set by the setter 41F is "200 kHz±5 kHz".

As described above, when the actual value of the frame frequency of the display controller 11 is 63 Hz, the touch detection controller 40 can reduce the influence of the noise at the local maxima B2 and A3 and appropriately perform the touch detection by setting the frequency of the touch drive signals Vcomt-1 to Vcomt-m to 210 kHz, and setting the passing frequency band of the band-pass filters BPF-1 to BPF-n to 210 kHz±5 kHz.

In Example 5, however, the touch detection controller 40 operates at the operating frequency higher by 5% than the design value thereof. Accordingly, when the setter 41F sets the frequency of the touch drive signals Vcomt-1 to Vcomt-m to "200 kHz", the drive signal output circuits 41G-1 to 41G-m output the touch drive signals Vcomt-1 to Vcomt-m at a frequency of 210 kHz that is higher by 5% than "200 kHz". In the same manner, when the setter 41F sets the passing frequency band of the band-pass filters BPF-1 to BPF-n to "200 kHz±5 kHz", the band-pass filters BPF-1 to BPF-n pass the signals at a frequency of 210 kHz±5 kHz that is higher by 5% than "200 kHz±5 kHz". In this manner, the touch detection controller 40 can reduce the influence of the noise at the local maxima B2 and A3, and thus can appropriately perform the touch detection.

The first column of Example 6 (seventh row) in the table 70 indicates that the actual value of the frame frequency of the display controller 11 is 57 Hz, and that the increase/decrease amount of the actual value 57 Hz of the frame frequency from the design value 60 Hz of the frame frequency is "−5%".

The second column of Example 6 (seventh row) in the table 70 indicates that the operating frequency of the touch detection controller 40 is lower than the design value thereof, and that the increase/decrease amount of the actual value of the operating frequency of the touch detection controller 40 from the design value of the operating frequency of the touch detection controller 40 is "−5%".

The third column of Example 6 (seventh row) in the table 70 indicates that the measurement value of the frame frequency of the display controller 11 measured by the frequency sampling circuit 48 is "60 Hz". As described above, when the operating frequency of the touch detection controller 40 is lower by 5% than the design value thereof, the frequency sampling circuit 48 measures the frame frequency of the display controller 11 to be the measurement value of "60 Hz" that is higher by 5% than the actual value of 57 Hz.

The fourth column of Example 6 (seventh row) in the table 70 indicates that the frequency adjustment coefficient calculated by the frequency adjustment coefficient calculator 41D is "1". As described above, if the measurement value of the frame frequency is "60 Hz", the frequency adjustment coefficient calculator 41D calculates the frequency adjustment coefficient corresponding to the ratio of the measurement value "60 Hz" of the frame frequency to the design value 60 Hz of the frame frequency to be "1".

The fifth column of Example 6 (seventh row) in the table 70 indicates that the setting value for the frequency of the touch drive signals Vcomt-1 to Vcomt-m set by the setter 41F is "200 kHz". The sixth column of Example 6 (seventh row) in the table 70 indicates that the setting value for the passing frequency band of the band-pass filters BPF-1 to BPF-n set by the setter 41F is "200 kHz±5 kHz".

As described above, when the actual value of the frame frequency of the display controller 11 is 57 Hz, the touch detection controller 40 can reduce the influence of the noise at the local maxima B2 and A3 and appropriately perform the touch detection by setting the frequency of the touch drive signals Vcomt-1 to Vcomt-m to 190 kHz, and setting the passing frequency band of the band-pass filters BPF-1 to BPF-n to 190 kHz±5 kHz.

In Example 6, however, the touch detection controller 40 operates at the operating frequency lower by 5% than the design value thereof. Accordingly, when the setter 41F sets the frequency of the touch drive signals Vcomt-1 to Vcomt-m to "200 kHz", the drive signal output circuits 41G-1 to 41G-m output the touch drive signals Vcomt-1 to Vcomt-m at a frequency of 190 kHz that is lower by 5% than "200 kHz". In the same manner, when the setter 41F sets the passing frequency band of the band-pass filters BPF-1 to BPF-n to "200 kHz±5 kHz", the band-pass filters BPF-1 to BPF-n pass the signals at a frequency of 190 kHz±5 kHz that is lower by 5% than "200 kHz±5 kHz". In this manner, the touch detection controller 40 can reduce the influence of the noise at the local maxima B2 and A3, and thus can appropriately perform the touch detection.

The first column of Example 7 (eighth row) in the table 70 indicates that the actual value of the frame frequency of the display controller 11 is 63 Hz, and that the increase/decrease amount of the actual value 63 Hz of the frame frequency from the design value 60 Hz of the frame frequency is "5%".

The second column of Example 7 (eighth row) in the table 70 indicates that the operating frequency of the touch detection controller 40 is lower than the design value thereof, and that the increase/decrease amount of the actual value of the operating frequency of the touch detection controller 40 from the design value of the operating frequency of the touch detection controller 40 is "−5%".

The third column of Example 7 (eighth row) in the table 70 indicates that the measurement value of the frame frequency of the display controller 11 measured by the frequency sampling circuit 48 is "66 Hz". As described above, when the operating frequency of the touch detection controller 40 is lower by 5% than the design value thereof, the frequency sampling circuit 48 measures the frame frequency of the display controller 11 to be the measurement value of "66 Hz" that is higher by 5% than the actual value of 63 Hz.

The fourth column of Example 7 (eighth row) in the table 70 indicates that the frequency adjustment coefficient calculated by the frequency adjustment coefficient calculator 41D is "1.1". As described above, when the measurement value of the frame frequency is "66 Hz", the frequency adjustment coefficient calculator 41D calculates the frequency adjustment coefficient corresponding to the ratio of the measurement value "66 Hz" of the frame frequency to the design value 60 Hz of the frame frequency to be "1.1".

The fifth column of Example 7 (eighth row) in the table 70 indicates that the setting value for the frequency of the touch drive signals Vcomt-1 to Vcomt-m set by the setter 41F is "220 kHz". The sixth column of Example 7 (eighth row) in the table 70 indicates that the setting value for the passing frequency band of the band-pass filters BPF-1 to BPF-n set by the setter 41F is "220 kHz±5 kHz".

As described above, when the actual value of the frame frequency of the display controller 11 is 63 Hz, the touch detection controller 40 can reduce the influence of the noise at the local maxima B2 and A3 and appropriately perform the touch detection by setting the frequency of the touch drive signals Vcomt-1 to Vcomt-m to 210 kHz, and setting the passing frequency band of the band-pass filters BPF-1 to BPF-n to 210 kHz±5 kHz.

In Example 7, however, the touch detection controller 40 operates at the operating frequency lower by 5% than the design value thereof. Accordingly, when the setter 41F sets the frequency of the touch drive signals Vcomt-1 to Vcomt-m to "220 kHz", the drive signal output circuits 41G-1 to 41G-m output the touch drive signals Vcomt-1 to Vcomt-m at a frequency of 210 kHz that is lower by 5% than "220 kHz". In the same manner, when the setter 41F sets the passing frequency band of the band-pass filters BPF-1 to BPF-n to "220 kHz±5 kHz", the band-pass filters BPF-1 to BPF-n pass the signals at a frequency of 210 kHz±5 kHz that is lower by 5% than "220 kHz±5 kHz". In this manner, the touch detection controller 40 can reduce the influence of the noise at the local maxima B2 and A3, and thus can appropriately perform the touch detection.

The first column of Example 8 (ninth row) in the table 70 indicates that the actual value of the frame frequency of the display controller 11 is 57 Hz, and that the increase/decrease amount of the actual value 57 Hz of the frame frequency from the design value 60 Hz of the frame frequency is "−5%".

The second column of Example 8 (ninth row) in the table 70 indicates that the operating frequency of the touch detection controller 40 is higher than the design value thereof, and that the increase/decrease amount of the actual value of the operating frequency of the touch detection controller 40 from the design value of the operating frequency of the touch detection controller 40 is "5%".

The third column of Example 8 (ninth row) in the table 70 indicates that the measurement value of the frame frequency of the display controller 11 measured by the frequency sampling circuit 48 is "54 Hz". As described above, when the operating frequency of the touch detection controller 40 is higher by 5% than the design value thereof, the frequency sampling circuit 48 measures the frame frequency of the display controller 11 to be the measurement value of "54 Hz" that is lower by approximately 5% than the actual value of 57 Hz.

The fourth column of Example 8 (ninth row) in the table 70 indicates that the frequency adjustment coefficient calculated by the frequency adjustment coefficient calculator 41D is "0.9". As described above, when the measurement value of the frame frequency is "54 Hz", the frequency adjustment coefficient calculator 41D calculates the frequency adjustment coefficient corresponding to the ratio of the measurement value "54 Hz" of the frame frequency to the design value 60 Hz of the frame frequency to be "0.9".

The fifth column of Example 8 (ninth row) in the table 70 indicates that the setting value for the frequency of the touch drive signals Vcomt-1 to Vcomt-m set by the setter 41F is "180 kHz". The sixth column of Example 8 (ninth row) in the table 70 indicates that the setting value for the passing frequency band of the band-pass filters BPF-1 to BPF-n set by the setter 41F is "180 kHz±5 kHz".

As described above, when the actual value of the frame frequency of the display controller 11 is 57 Hz, the touch detection controller 40 can reduce the influence of the noise at the local maxima B2 and A3 and appropriately perform the touch detection by setting the frequency of the touch drive signals Vcomt-1 to Vcomt-m to 190 kHz, and setting the passing frequency band of the band-pass filters BPF-1 to BPF-n to 190 kHz±5 kHz.

In Example 8, however, the touch detection controller 40 operates at the operating frequency higher by 5% than the design value thereof. Accordingly, when the setter 41F sets the frequency of the touch drive signals Vcomt-1 to Vcomt-m to "180 kHz", the drive signal output circuits 41G-1 to 41G-m output the touch drive signals Vcomt-1 to Vcomt-m at a frequency of 190 kHz that is higher by 5% than "180 kHz". In the same manner, when the setter 41F sets the passing frequency band of the band-pass filters BPF-1 to BPF-n to "180 kHz±5 kHz", the band-pass filters BPF-1 to BPF-n pass the signals at a frequency of 190 kHz±5 kHz that is higher by 5% than "180 kHz±5 kHz". In this manner, the touch detection controller 40 can reduce the influence of the noise at the local maxima B2 and A3, and thus can appropriately perform the touch detection.

As described above, the display device with a touch detection function 1 can reduce the influence of the noise propagating from the liquid crystal display device 20 to the touch detection device 30, and thus can appropriately perform the touch detection.

To reduce the influence of the noise propagating from the liquid crystal display device 20 to the touch detection device 30, it is also conceivable to employ a frequency hopping method in which the frequency of the touch drive signals Vcomt is changed at regular time intervals. The frequency hopping method cannot, however, prevent the frequency of the touch drive signals Vcomt from overlapping or approximating the frequency of the noise.

In contrast, in the display device with a touch detection function 1, attention has been paid to the correlation between the frequency of the noise and the frame frequency, and thus the frequency of the touch drive signals Vcomt is changed according to the frame frequency. Therefore, compared with the case of employing the frequency hopping method, the display device with a touch detection function 1 can reduce the influence of the noise to a lower level, and thus can more appropriately perform the touch detection.

Modification

Figure 15:
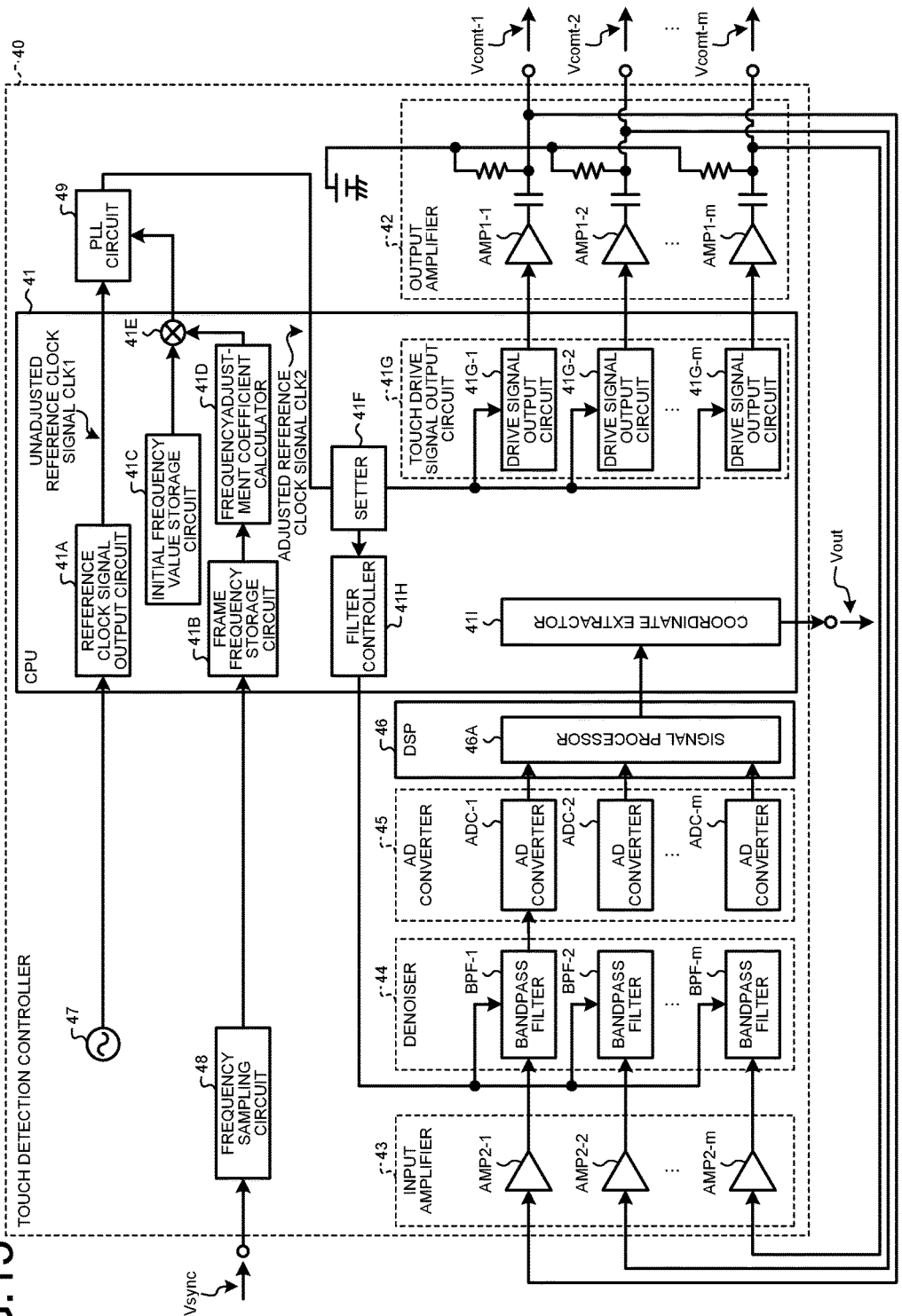
FIG. 15 is a diagram illustrating a modification of the configuration of the touch detection controller.

FIG. 15 is a block diagram illustrating a modification of the display device with a touch detection function according to the present embodiment. No description will be given of the same component parts as those in FIG. 11.

The block diagram of the present modification illustrates the self-capacitance touch detection function, and differs from FIG. 11 in the following points.

In the case of the self-capacitance touch detection function, the drive electrodes are the same as the detection electrodes. The touch detection controller 40 outputs the m touch drive signals Vcomt-1 to Vcomt-m to the m touch detection electrodes, and detects an amount of variation in the self-capacitance of each of the touch detection electrodes so as to detect whether the detection target object OBJ is in contact with or in proximity to the touch detection electrode.

In the example illustrated in FIG. 15, the m amplifiers AMP1-1 to AMP1-m output the touch drive signals Vcomt-1 to Vcomt-m to the m touch detection electrodes through capacity couplings. Each of the m touch detection electrodes is set to a predetermined bias voltage through a resistance having predetermined impedance. In this case, when the detection target object OBJ is in contact with or in proximity to the touch detection electrode, the capacitance between the detection target object OBJ and the touch detection electrode increases, and the voltage variation amount of the touch detection electrode driven by corresponding one of the amplifiers decreases. The touch detection controller 40 detects the voltage variation amount using each of the amplifiers AMP2-1 to AMP2-m of the input amplifier 43 so as to detect whether the detection target object OBJ is present. The self-capacitance touch detection function is not limited to being configured by the circuit described above, but can be configured by various detection circuits.

At least either the touch detection electrodes TDL or the touch drive electrodes TL in FIG. 8 may be used as the touch detection electrodes of the self-capacitance detection-type. The shape of the touch detection electrodes is not limited to the stripe-like shape, and may be a shape in which the electrodes are individually formed in the X- and Y-directions in a matrix.

While the preferred embodiment of the present invention has been described above, the present invention is not limited to the embodiment described above. The content disclosed in the embodiment is merely an example, and can be variously modified within the scope not departing from the gist of the present invention. Any modifications appropriately made within the scope not departing from the gist of the present invention naturally belong to the technical scope of the present invention.

The advantages are that the embodiment of the present invention provides a display device with a touch detection function and a control method thereof that can suppress an influence of internal noise and perform touch detection appropriately.

What is claimed is:

1. A display device with a touch detection function, the display device comprising:
    a touch detector including first group electrodes extending in a first direction and second group electrodes extending in a second direction intersecting the first direction;
    a display unit configured to display an image;
    a display controller configured to control the display unit to display the image on the display unit; and
    a touch detection controller configured to detect contact or proximity of a detection target object based on mutual capacitances between the first group electrodes and the second group electrodes,
    wherein
    the touch detection controller is configured to measure a frame frequency that is a number of times frames are displayed per unit time, to sequentially output touch drive signals having a frequency corresponding to the frame frequency to the first group electrodes, and to detect the contact or proximity of the detection target object based on a plurality of signals output from the respective second group electrodes,
    the touch detection controller includes:
        a phase-locked loop circuit configured to output a reference clock signal corresponding to the frame frequency;
        a touch drive signal output circuit configured to sequentially output the touch drive signals to the first group electrodes;
        a setter configured to set the frequency of the touch drive signals to the touch drive signal output circuit based on the reference clock signal; and
        a plurality of band-pass filters configured to pass respective signals within a predetermined passing frequency band while removing respective signals in other frequency bands from among the signals output from the respective second group electrodes, and
    the setter is configured to set the passing frequency band including the frequency of the touch drive signals to the band-pass filters based on the reference clock signal.

2. The display device with a touch detection function according to claim 1, wherein the touch detection controller is configured to measure the frame frequency based on a vertical synchronizing signal that is supplied from the display controller and that indicates display start timing of each frame.

3. A method for controlling a display device with a touch detection function that includes a touch detector including first group electrodes extending in a first direction and second group electrodes extending in a second direction intersecting the first direction, and a display unit configured to display an image, the method comprising:
    measuring a frame frequency that is a number of times frames are displayed per unit time;
    sequentially outputting touch drive signals having a frequency corresponding to the frame frequency to the first group electrodes;
    detecting contact or proximity of a detection target object based on a plurality of signals output from the respective second group electrodes;
    setting, based on a reference clock signal corresponding to the frame frequency, the frequency of the touch drive signals to a touch drive signal output circuit configured to sequentially output the touch drive signals to the first group electrodes; and
    setting, based on the reference clock signal, a passing frequency band including the frequency of the touch drive signals to a plurality of band-pass filters configured to pass respective signals within the passing frequency band while removing respective signals in other frequency bands from among the signals output from the respective second group electrodes.

4. The method according to claim 3, further comprising measuring the frame frequency based on a vertical synchronizing signal that indicates display start timing of each frame.

5. A display device with a touch detection function, the display device comprising:
    a plurality of touch detection electrodes configured to detect whether a detection target object is in proximity thereto;
    a display unit configured to display an image;
    a display controller configured to control the display unit to display the image on the display unit; and
    a touch detection controller configured to detect contact or proximity of the detection target object based on electrostatic capacitances of the touch detection electrodes,
    wherein
    the touch detection controller is configured to measure a frame frequency that is a number of times frames are displayed per unit time, to output touch drive signals having a frequency corresponding to the frame frequency to the touch detection electrodes, and to detect the contact or proximity of the detection target object based on a plurality of signals output from the respective touch detection electrodes,
    the touch detection controller includes:
        a phase-locked loop circuit configured to output a reference clock signal corresponding to the frame frequency;
        a touch drive signal output circuit configured to sequentially output the touch drive signals to the touch detection electrodes;
        a setter configured to set the frequency of the touch drive signals to the touch drive signal output circuit based on the reference clock signal; and
        a plurality of band-pass filters configured to pass respective signals within a predetermined passing frequency band while removing respective signals in other frequency bands from among the signals output from the respective touch detection electrodes, and
    the setter is configured to set the passing frequency band including the frequency of the touch drive signals to the band-pass filters based on the reference clock signal.

6. The display device with a touch detection function according to claim 5, wherein the touch detection controller is configured to measure the frame frequency based on a vertical synchronizing signal that is supplied from the display controller and that indicates display start timing of each frame.

* * * * *